United States Patent
Lim et al.

(10) Patent No.: US 11,588,673 B2
(45) Date of Patent: Feb. 21, 2023

(54) TECHNIQUES FOR TRANSMITTING INFORMATION RELATED TO A PPDU FORMAT IN WIRELESS LOCAL AREA NETWORK SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/164,222

(22) Filed: Feb. 1, 2021

(65) Prior Publication Data

US 2021/0250215 A1    Aug. 12, 2021

(30) Foreign Application Priority Data

Jan. 30, 2020   (KR) .................. 10-2020-0011416

(51) Int. Cl.
*H04L 27/26*   (2006.01)
*H04W 80/00*   (2009.01)

(52) U.S. Cl.
CPC ...... *H04L 27/2613* (2013.01); *H04L 27/2603* (2021.01); *H04W 80/00* (2013.01)

(58) Field of Classification Search
CPC ............ H04L 27/2603; H04L 27/2613; H04L 27/26136; H04L 27/2646; H04L 5/0091; H04L 5/0096; H04W 80/00
See application file for complete search history.

(56) References Cited

U.S. PATENT DOCUMENTS

2021/0028897 A1*   1/2021   Park ................... H04L 5/0044

\* cited by examiner

*Primary Examiner* — Melvin C Marcelo
*Assistant Examiner* — Natali Pascual Peguero
(74) *Attorney, Agent, or Firm* — Lee Hong Degerman Kang Waimey

(57) ABSTRACT

According to various embodiments, a receiving station (STA) may receive a physical layer protocol data unit (PPDU). The PPDU may include a first signal field and a second signal field. The first signal field may include 3-bit information. The receiving STA may determine whether the PPDU is related to single user (SU) transmission or multiple user (MU) transmission, whether the PPDU is related to orthogonal frequency division multiple access (OFDMA), whether the PPDU is related to multi-user multiple input multiple output (MU-MIMO), and whether the PPDU is related to a trigger-based (TB) PPDU, based on the 3-bit information.

7 Claims, 24 Drawing Sheets

FIG. 1
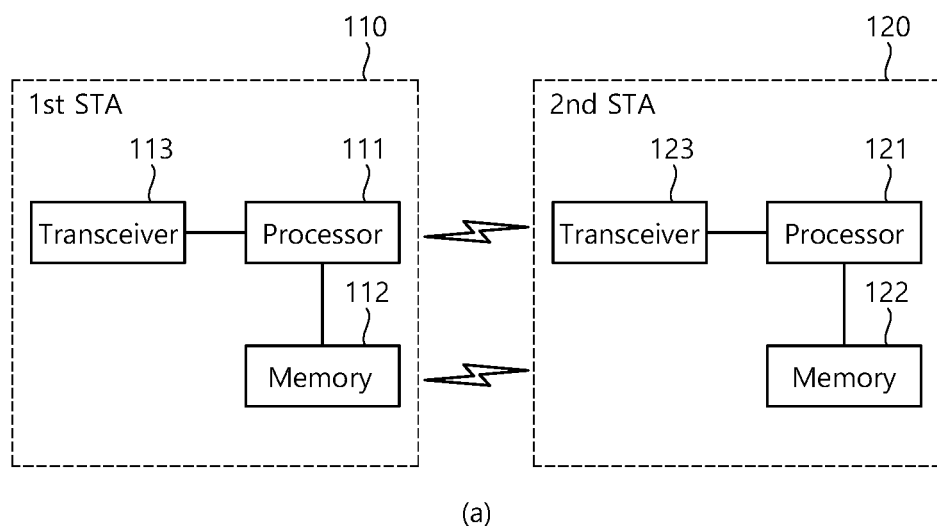
(a)
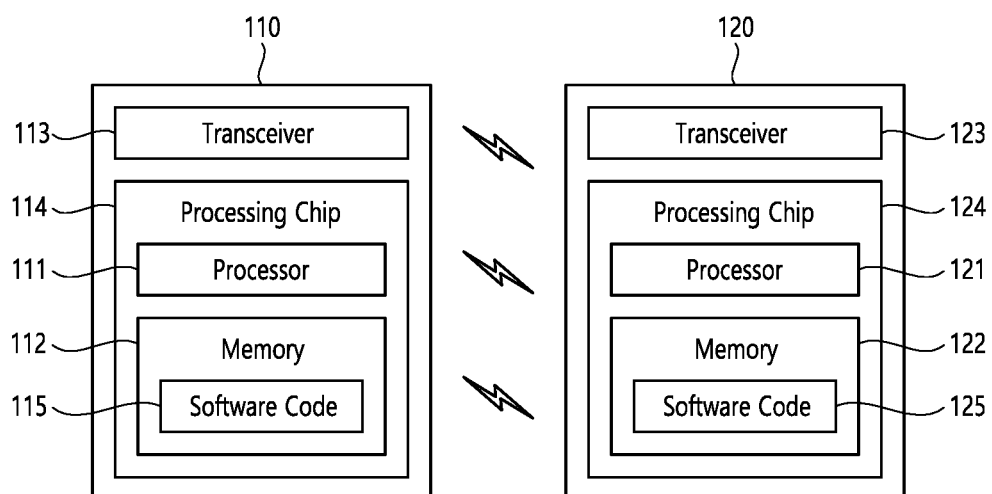
(b)

FIG. 2
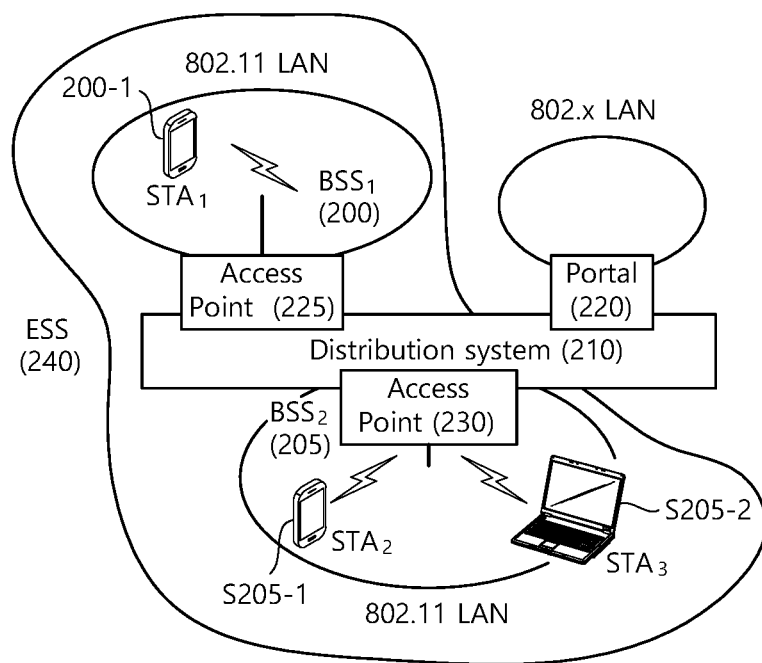
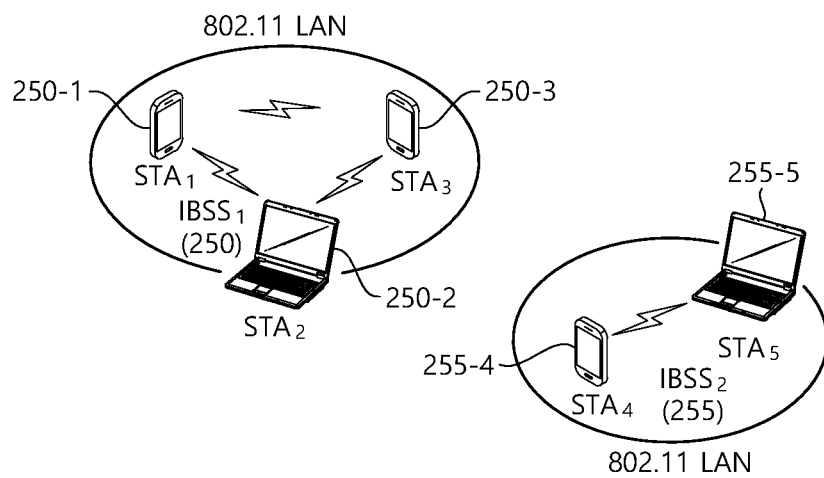

| Version independent field (2210) | Version dependent field (2220) |

TECHNIQUES FOR TRANSMITTING INFORMATION RELATED TO A PPDU FORMAT IN WIRELESS LOCAL AREA NETWORK SYSTEM

CROSS-REFERENCE TO RELATED APPLICATIONS

Pursuant to 35 U.S.C. § 119(a), this application claims the benefit of earlier filing date and right of priority to Korean Patent Application No. 10-2020-0011416, filed on Jan. 30, 2020, the contents of which are hereby incorporated by reference herein in its entirety.

BACKGROUND OF THE DISCLOSURE

Field of the Disclosure

The present specification relates to a scheme for transmitting information related to a physical layer protocol data unit (PPDU) format in a wireless local area network (WLAN) system, and more particularly, to a method for transmitting the information related to the PPDU format through 3-bit information in the WLAN system, and an apparatus supporting the method.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In addition, in the EHT standard, PPDUs may be configured in various formats/types. The PPDUs of the various formats/types may be used for different purposes, and may be configured to be different from each other. Therefore, a technical feature for transmitting information related to the various formats/types of the PPDUs may be required.

SUMMARY

According to various embodiments, a receiving station (STA) may perform: receiving a physical layer protocol data unit (PPDU), wherein the PPDU includes a first signal field and a second signal field, the first signal field includes 3-bit information, whether the PPDU is related to single user (SU) transmission or multiple user (MU) transmission, whether the PPDU relates to orthogonal frequency division multiple access (OFDMA), whether the PPDU relates to multi-user multiple input multiple output (MU-MIMO), and whether the PPDU relates to a trigger-based (TB) PPDU are determined based on the 3-bit information, and the second signal field is configured based on the 3-bit information; and decoding the PPDU, based on the first signal field and the second signal field.

According to various embodiments, a PPDU may include a first signal field and a second signal field. The first signal field may include 3-bit information. A receiving STA which has received the PPDU may determine whether the PPDU is related to SU transmission or MU transmission, whether the PPDU relates to OFDMA, whether the PPDU relates to MU-MIMO, and whether the PPDU relates to a TB PPDU, based on the 3-bit information.

According to various embodiments, the second signal field may be configured based on the 3-bit information. The second signal field may be partially included or omitted, based on the 3-bit information. The second signal field may be omitted.

According to various embodiments, a receiving STA for receiving a PPDU may early confirm information related to a format of the PPDU, and may decode the PPDU, based on the confirmed information.

BRIEF DESCRIPTION OF THE DRAWINGS

FIG. 1 illustrates an example of a transmitting apparatus and/or receiving apparatus of the present specification.

FIG. 2 is a conceptual view illustrating a structure of a WLAN.

FIG. 22 illustrates an example of U-SIG.

DESCRIPTION OF EXEMPLARY EMBODIMENTS

Figure 3:
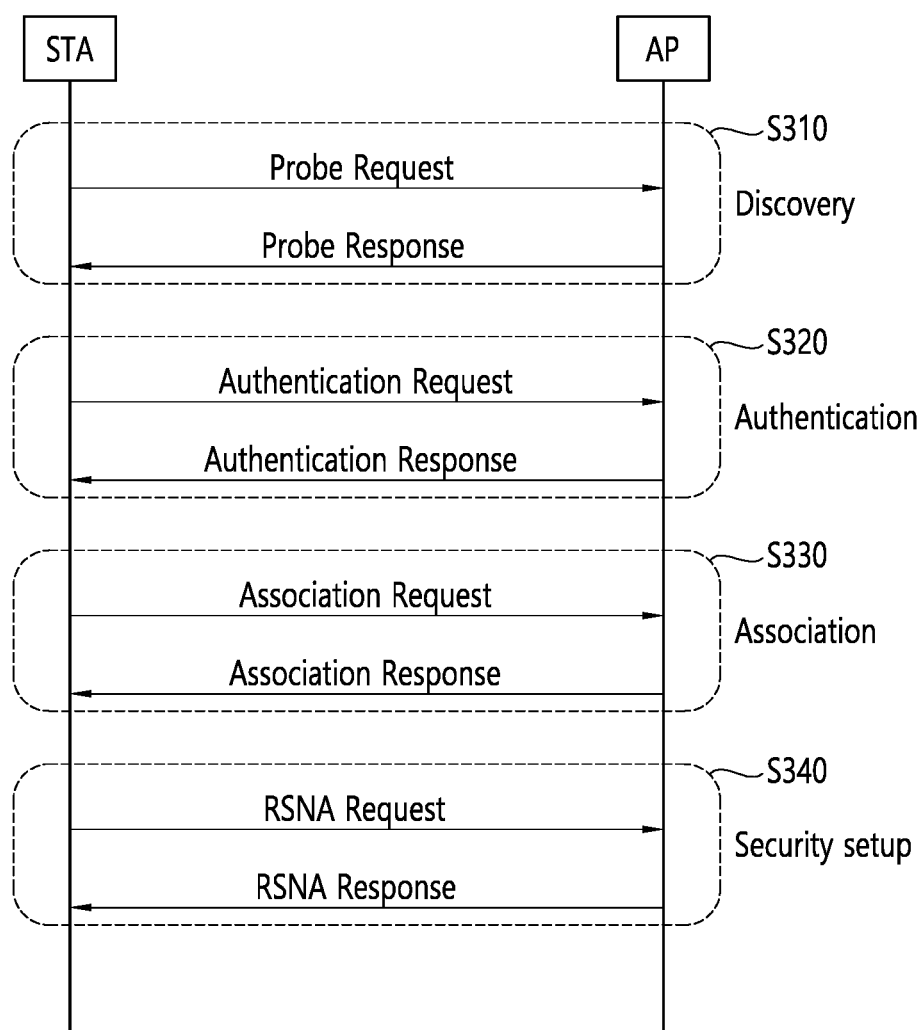
FIG. 3 is a view illustrating a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/ response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
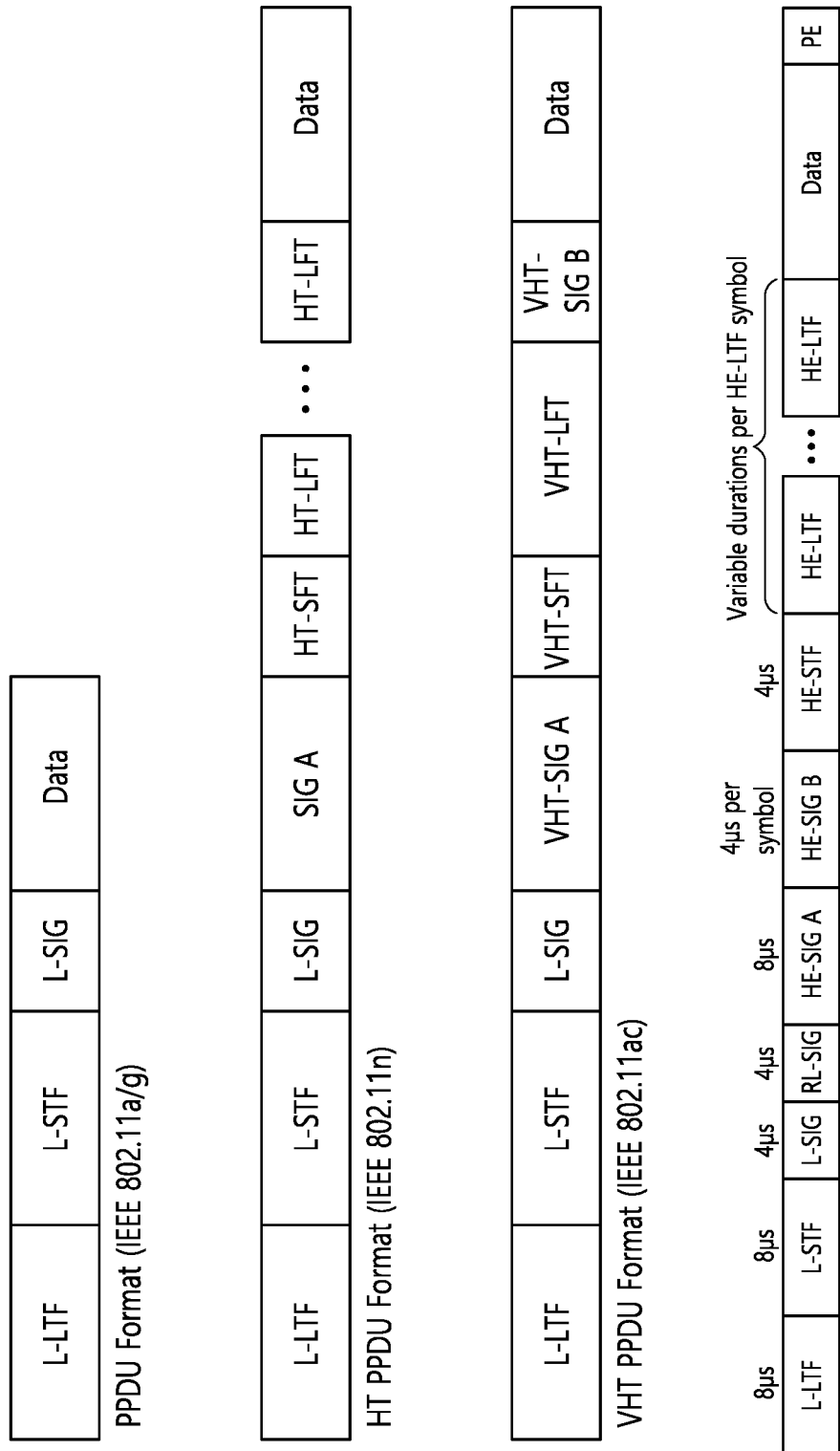
FIG. 4 is a view illustrating an example of a physical protocol data unit (PPDU) used in the IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
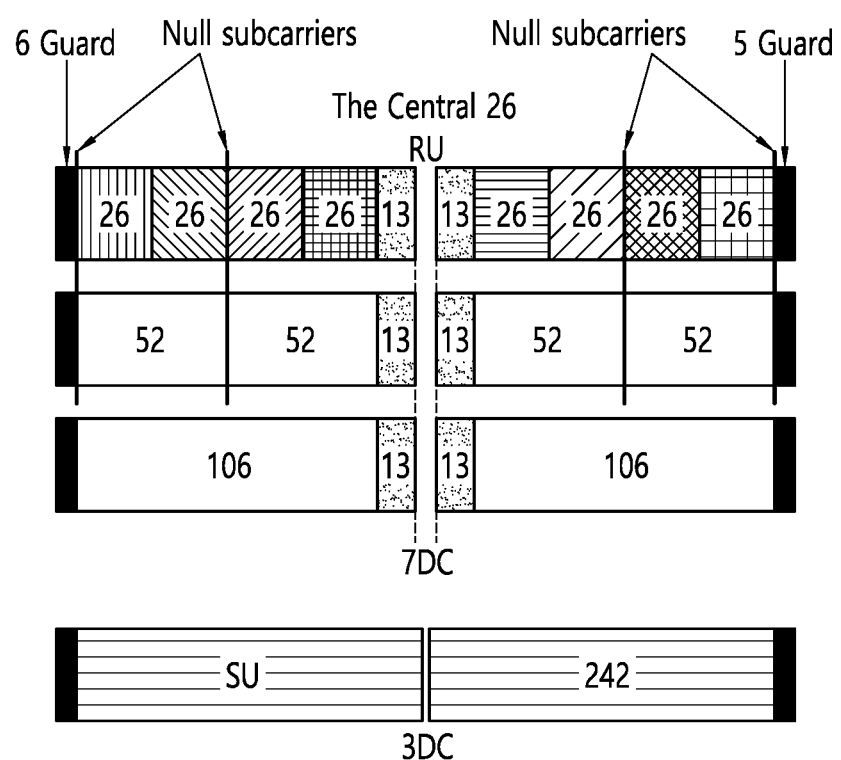
FIG. 5 is a view illustrating an arrangement of a resource unit (RU) used in a 20 MHz band.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
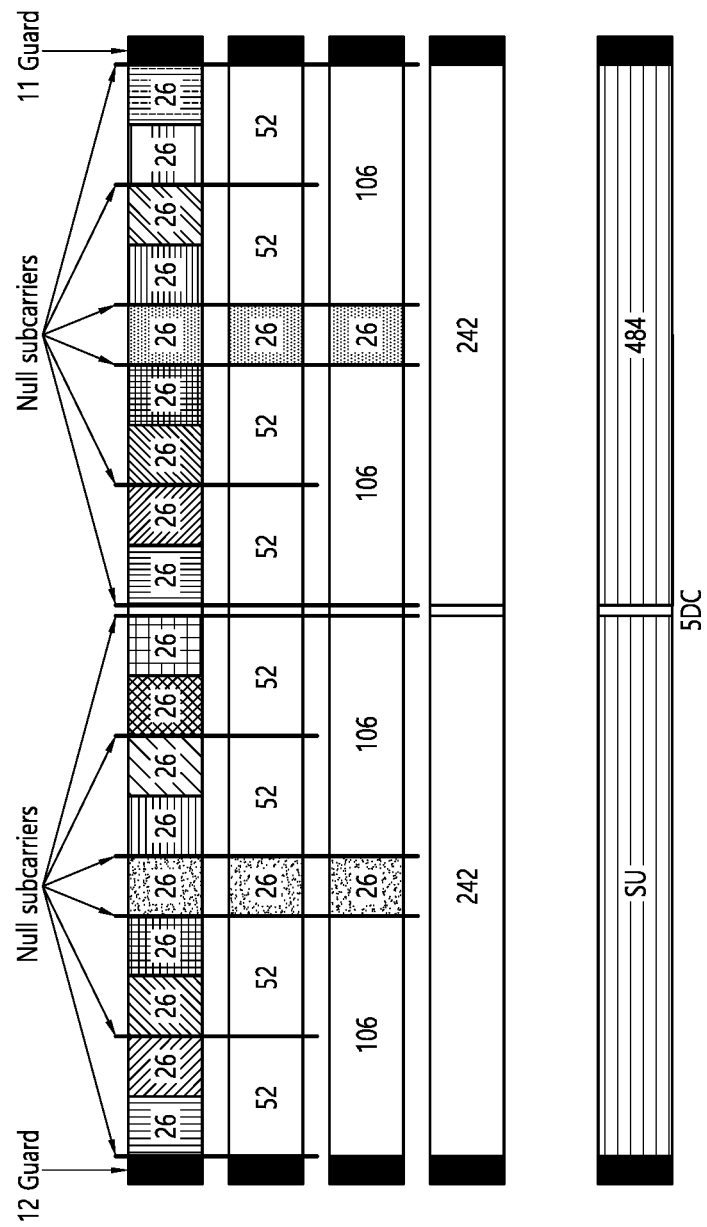
FIG. 6 is a view illustrating an arrangement of a resource unit (RU) used in a 40 MHz band.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
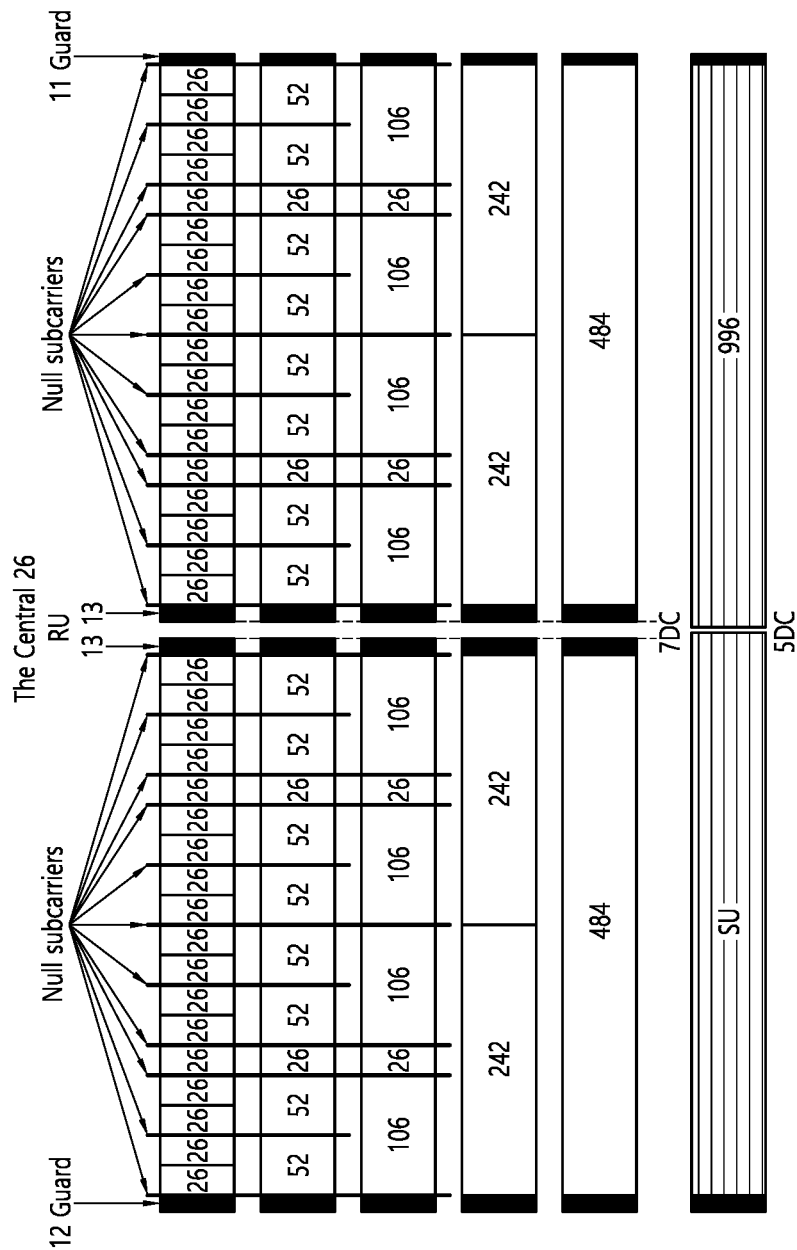
FIG. 7 is a view illustrating an arrangement of a resource unit (RU) used in an 80 MHz band.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
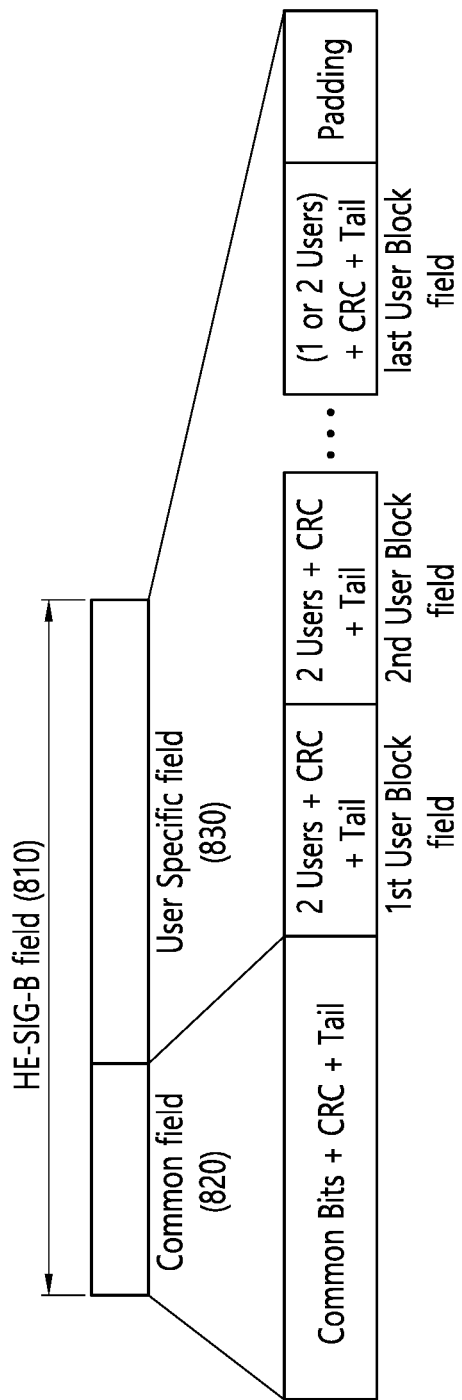
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | | | 106 | | 26 | 26 | 26 | 26 | 26 | 8 |
| 01001$y_2y_1y_0$ | | | | | 106 | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
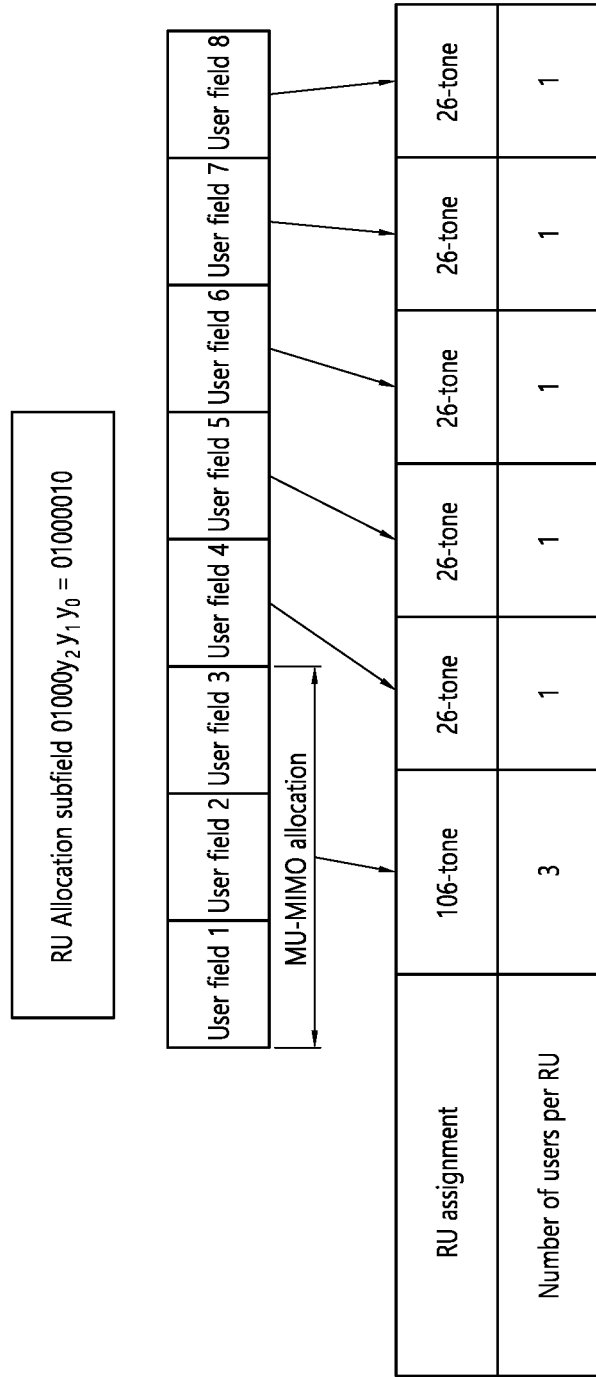
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1001 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 1001 | 2 | 2 | 2 | 1 | 1 | | | | 8 | |
| 6 | 0000-0010 | 1-3 | 1 | 1 | 1 | 1 | 1 | | | 6-8 | 4 |
|   | 1001 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N STS[1], N STS[2], and N STS[3] may be determined as shown in Table 3. For example, when a values of the second bit (B11-B14) is "0011", it may be set to N STS[1]=4, N STS[2]=1, N STS [3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
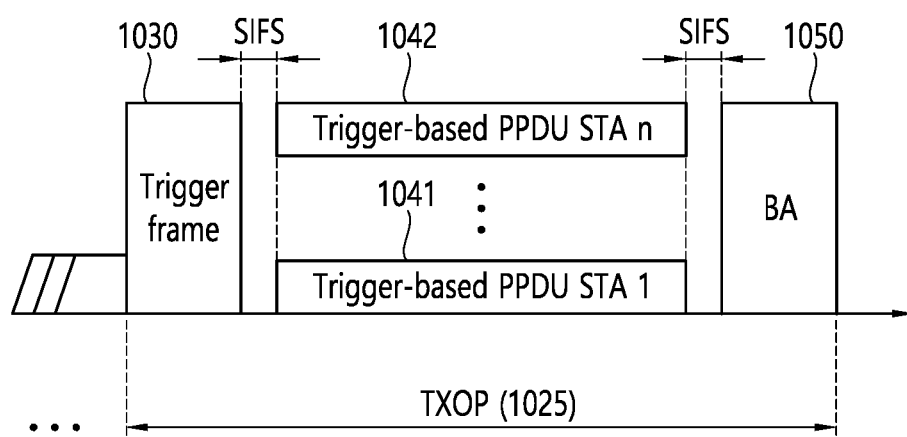
FIG. 10 illustrates an operation based on UL-MU.

FIG. 10 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
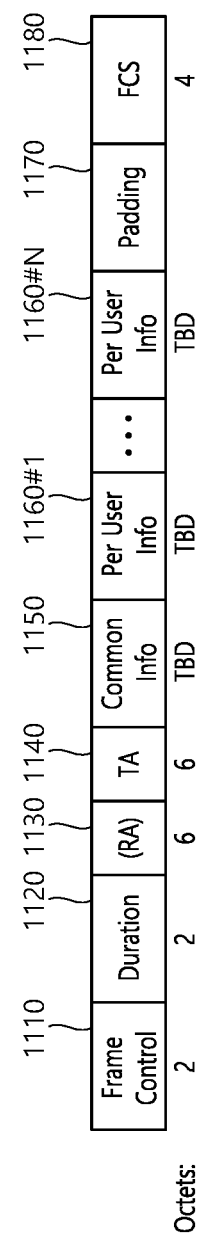
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
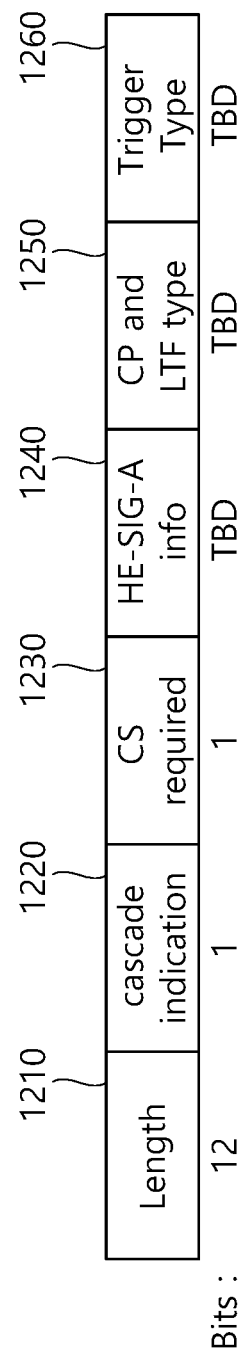
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
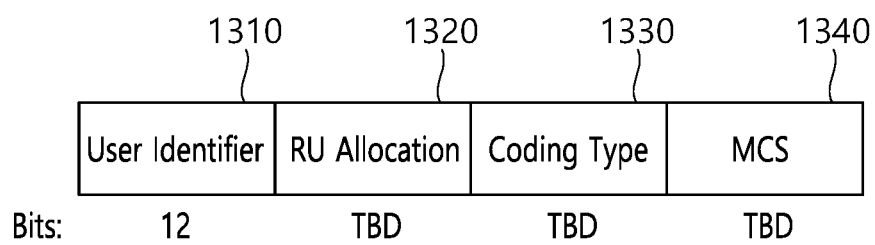
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
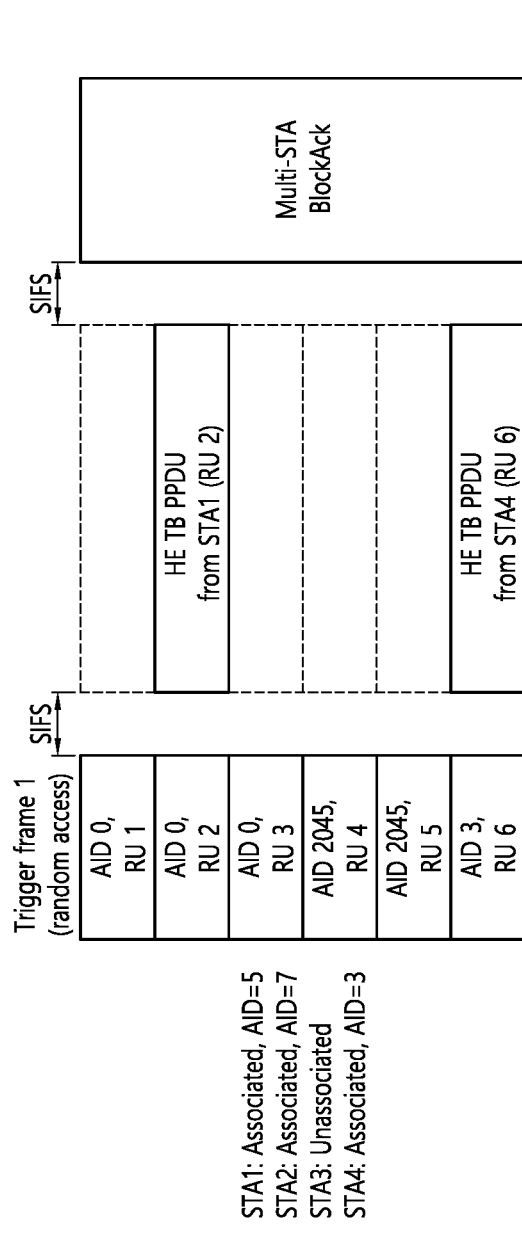
FIG. 14 describes a technical feature of the UORA scheme.

FIG. 14 describes a technical feature of the UORA scheme.

A transmitting STA (e.g., AP) may allocate six RU resources through a trigger frame as shown in FIG. 14. Specifically, the AP may allocate a $1^{st}$ RU resource (AID 0, RU 1), a $2^{nd}$ RU resource (AID 0, RU 2), a $3^{rd}$ RU resource (AID 0, RU 3), a $4^{th}$ RU resource (AID 2045, RU 4), a $5^{th}$ RU resource (AID 2045, RU 5), and a $6^{th}$ RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the $1^{st}$ to $3^{rd}$ RU resources of FIG. 14 may be used as a UORA resource for the associated STA, the $4^{th}$ and $5^{th}$ RU resources of FIG. 14 may be used as a UORA resource for the un-associated STA, and the $6^{th}$ RU resource of FIG. 14 may be used as a typical resource for UL MU.

In the example of FIG. 14, an OFDMA random access backoff (OBO) of an STA1 is decreased to 0, and the STA1 randomly selects the $2^{nd}$ RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
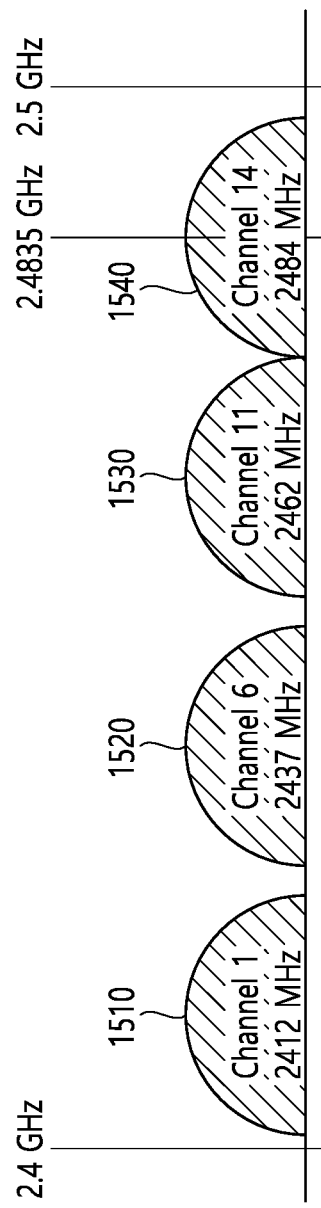
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of $1^{st}$ to $4^{th}$ frequency domains 1510 to 1540 shown herein may include one channel. For example, the $1^{st}$ frequency domain 1510 may include a channel 1 (a 20 MHz channel having an index 1). In this case, a center frequency of the channel 1 may be set to 2412 MHz. The $2^{nd}$ frequency domain 1520 may include a channel 6. In this case, a center frequency of the channel 6 may be set to 2437 MHz. The $3^{rd}$ frequency domain 1530 may include a channel 11. In this case, a center frequency of the channel 11 may be set to 2462 MHz. The $4^{th}$ frequency domain 1540 may include a channel 14. In this case, a center frequency of the channel 14 may be set to 2484 MHz.

Figure 16:
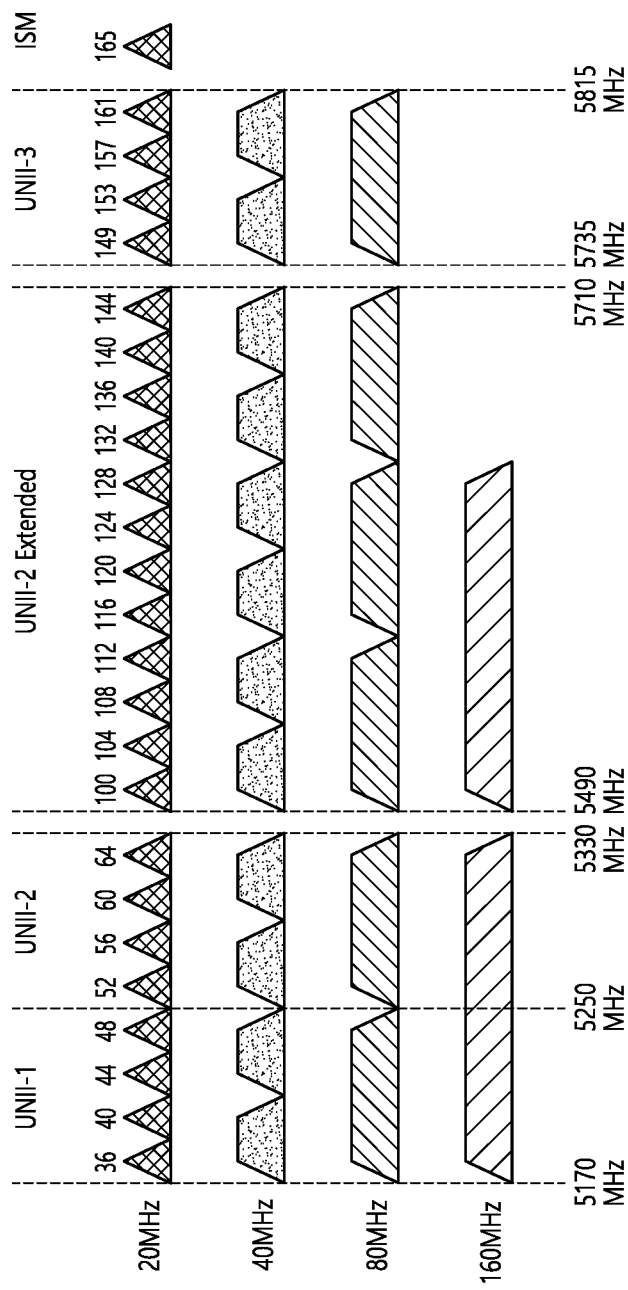
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
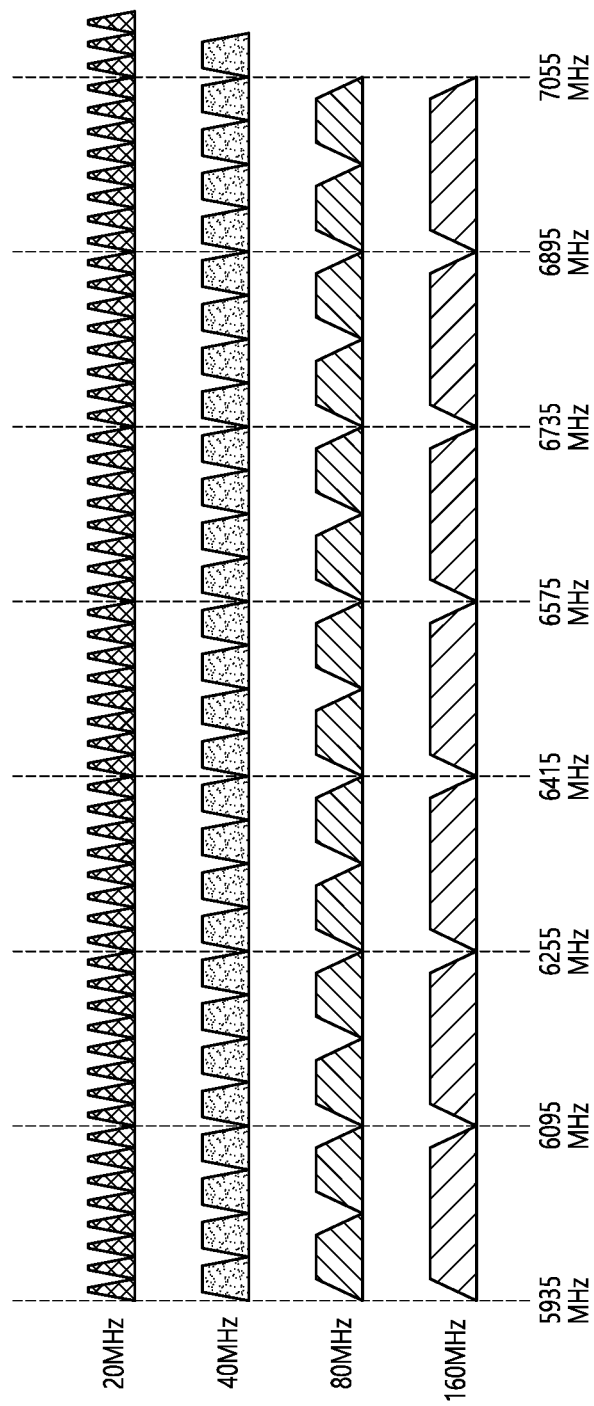
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, an STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | | 106 | | | 1 |
| 17 | 26 | 26 | 52 | | 26 | | 106 | | | 1 |
| 18 | 52 | | 26 | 26 | 26 | | 106 | | | 1 |
| 19 | 52 | | 52 | | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | | 52 | | 52 | | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 25 | | | 242-tone RU empty (with zero users) | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | 52 | | 26 | | 52+26 | | 26 | 1 |
| 64 | 26 | | 26 + 52 | | 26 | | 52+26 | | 26 | 1 |
| 65 | 26 | | 26 + 52 | | 26 | | 52 | | 52 | 1 |

TABLE 7

| | | | | | | | | | | |
|---|---|---|---|---|---|---|---|---|---|---|
| 66 | 52 | | 26 | 26 | 26 | | 52+26 | | 26 | 1 |
| 67 | 52 | | 52 | | 26 | | 52+26 | | 26 | 1 |
| 68 | 52 | | 52 + 26 | | | 52 | | 52 | | 1 |
| 69 | 26 | 26 | 26 | 26 | | 26 + 106 | | | | 1 |
| 70 | 26 | | 26 + 52 | | 26 | | 106 | | | 1 |
| 71 | 26 | 26 | 52 | | | 26+106 | | | | 1 |
| 72 | 26 | | 26 + 52 | | | 26 + 106 | | | | 1 |
| 73 | 52 | | 26 | 26 | | 26+106 | | | | 1 |
| 74 | 52 | | 52 | | | 26 + 106 | | | | 1 |
| 75 | | 106 + 26 | | | | 26 | 26 | 26 | 26 | 1 |
| 76 | | 106 + 26 | | | | 26 | 26 | 52 | | 1 |
| 77 | | 106 + 26 | | | | 52 | | 26 | 26 | 1 |
| 78 | | 106 | | | 26 | | 52 + 26 | | 26 | 1 |
| 79 | | 106 + 26 | | | | 52 + 26 | | | 26 | 1 |
| 80 | | 106 + 26 | | | | 52 | | 52 | | 1 |
| 81 | | 106 + 26 | | | | | 106 | | | 1 |
| 82 | | 106 | | | | | 26 + 106 | | | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2x STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\}  \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1×STF) sequence.

$$\text{EHT-STF}(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496:16:496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496)=\{-M,-1,M,0,-M,1,-M\}*(1+j)/\text{sqrt}(2) \quad \text{<Equation 6>}$$

Equation 7 to Equation 11 below relate to an example of a second type (i.e., 2×STF) sequence.

$$\text{EHT-STF}(-120:8:120)=\{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248:8:248)=\{M,-1,-M,0,M,-1,M\}*(1+j)/\text{sqrt}(2)$$

$$\text{EHT-STF}(-248)=0$$

$$\text{EHT-STF}(248)=0 \quad \text{<Equation 8>}$$

The EHT-STF for the 80 MHz PPDU may be configured based on the following equation.

$$\text{EHT-STF}(-504:8:504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$\text{EHT-STF}(-1016:16:1016)=\{M,-1,M,-1,-M,-1,M,0,-M,1,M,1,-M,0,-M,1,-M,1,M,1,-M,0,-M,1,M,1,-M,1,-M\}*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504:8:504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
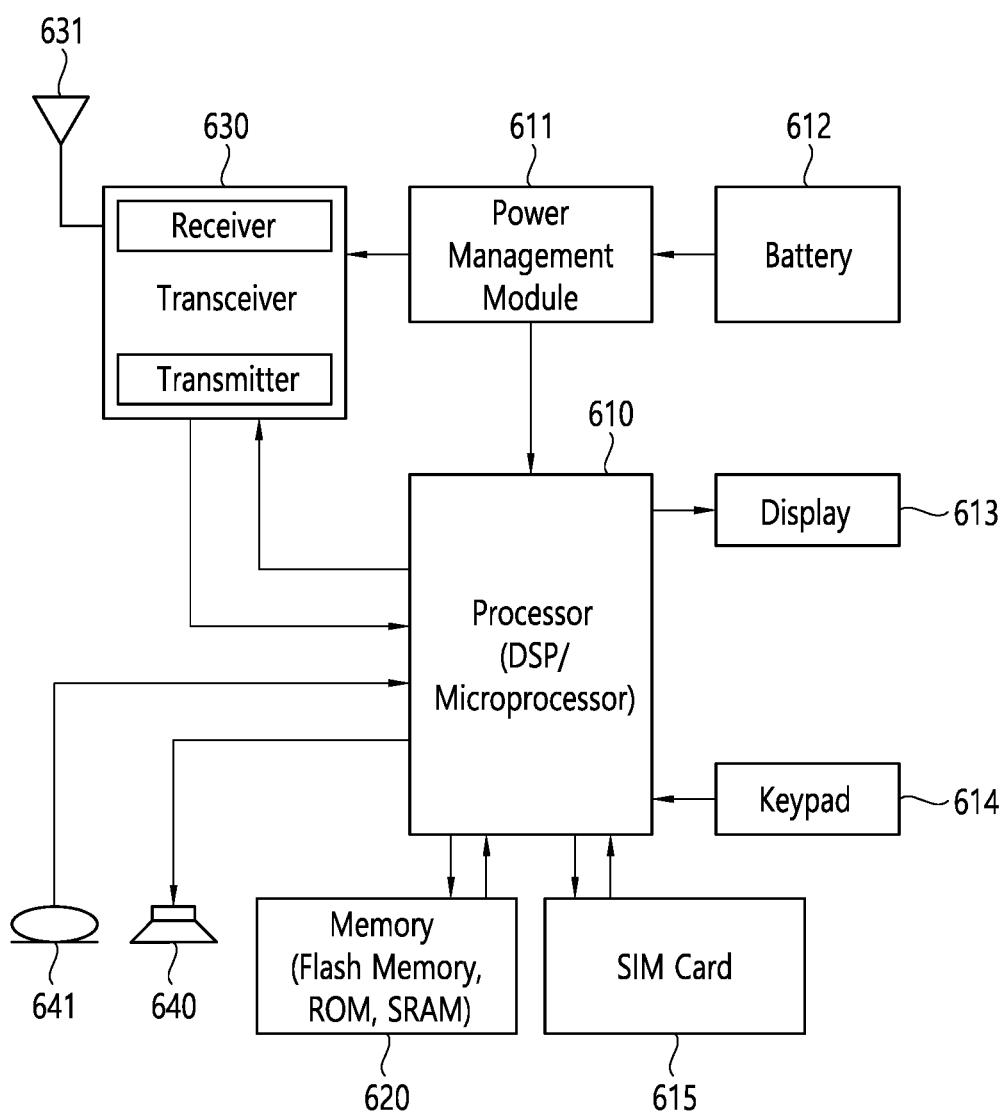
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
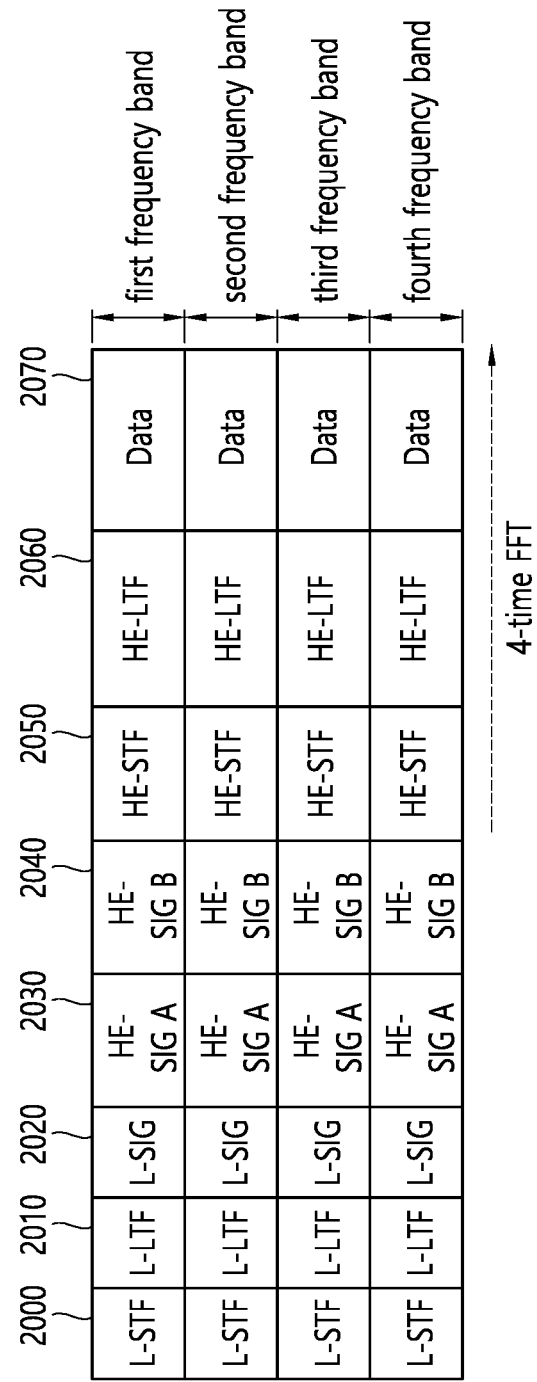
FIG. 20 illustrates an example of an HE-PPDU.

FIG. 20 illustrates an example of an HE-PPDU.

An L-STF 2000 illustrated may include a short training orthogonal frequency division multiplexing (OFDM) symbol. The L-STF 2000 may be used for frame detection, automatic gain control (AGC), diversity detection, and coarse frequency/time synchronization.

An L-LTF 2010 may include a long training orthogonal frequency division multiplexing (OFDM) symbol. The L-LTF 2010 may be used for fine frequency/time synchronization and channel prediction.

An L-SIG 2020 may be used for transmitting control information. The L-SIG 2020 may include information regarding a data rate and a data length. Further, the L-SIG 2020 may be repeatedly transmitted. That is, a new format in which the L-SIG 2020 is repeated (for example, may be referred to as R-LSIG) may be configured.

An HE-SIG-A 2030 may include the control information common to a receiving STA.

Specifically, the HE-SIG-A 2030 may include information on: 1) a DL/UL indicator; 2) a BSS color field as an identifier of a BSS; 3) a field indicating a remaining time of a current TXOP period; 4) a bandwidth field indicating whether it is 20, 40, 80, 160 and 80+80 MHz; 5) a field indicating an MCS scheme applied to the HE-SIG-B; 6) an indication field regarding whether the HE-SIG-B is modulated by a dual subcarrier modulation scheme for MCS; 7) a field indicating the number of symbols used for the HE-SIG-B; 8) a field indicating whether the HE-SIG-B is generated across a full band; 9) a field indicating the number of symbols of the HE-LTF; 10) a field indicating the length of the HE-LTF and a CP length; 11) a field indicating whether an additional OFDM symbol is present for LDPC coding; 12) a field indicating control information regarding packet extension (PE); and 13) a field indicating information on a CRC field of the HE-SIG-A. A specific field of the HE-SIG-A may be added or partially omitted. Further, some fields of the HE-SIG-A may be partially added or omitted in other environments other than a multi-user (MU) environment.

In addition, the HE-SIG-A 2030 may consist of two parts, i.e., HE-SIG-A1 and HE-SIG-A2. The HE-SIG-A1 and HE-SIG-A2 included in the HE-SIG-A may be defined as a format structure (field) as shown below according to a PPDU. First, an HE-SIG-A field of an HE SU PPDU may be defined as follows.

TABLE 8

| Two Parts of HE-SIG-A | Bit | Field | Number of bits | Description |
| --- | --- | --- | --- | --- |
| HE-SIG-A1 | B0 | Format | 1 | Differentiate an HE SU PPDU and HE ER SU PPDU from an HE TB PPDU:<br>Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1.<br>Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU:<br>Set to n for MCSn, where n = 0, 1, 2, . . . . , 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 for MCS 0<br>Values 1-15 are reserved |

TABLE 9

| Two Parts of HE-SIG-A | Bit | Field | Number of bits | Description |
| --- | --- | --- | --- | --- |
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if (#15489) both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC (#15490). |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU (#16804).<br>Set to a value from Table 28-21 (Spatial Reuse field encoding for an HE SU PPDU, HE ER SU PPDU, and HE MU PPDU), see 27.11.6 (SPATIAL_REUSE)<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial<br>reuse during this PPDU. For the interpretation of other values see 27.11.6 (SPATIAL_REUSE) and 27.9 (Spatial reuse operation). |

TABLE 9-continued

| Two Parts of HE-SIG-A | Bit | Field | Number of bits | Description |
|---|---|---|---|---|
| | B19-B20 | Bandwidth | 2 | For an HE SU PPDU:<br>Set to 0 for 20 MHz<br>Set to 1 for 40 MHz<br>Set to 2 for 80 MHz.<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |

TABLE 10

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if (#Ed) both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if (#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor (TXOP_DURATION/8)(#16277).<br>Otherwise, B0 is set to 1 and B1-B6 is set to floor ((TXOP_DURATION − 512 )/128)(#16277).<br>where (#16061)<br>B0 indicates the TXOP length granularity. Set to 0 for 8 μs; otherwise set to 1 for 128 μs.<br>B1-B6 indicates the sealed value of the TXOP_DURATION |
| | B7 | Coding | 1 | Indicates whether BCC or LDPC is used:<br>Set to 0 to indicate BCC<br>Set to 1 to indicate LDPC |

TABLE 11

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC:<br>Set to 1 if an extra OFDM symbol segment for LDPC is present |

TABLE 11-continued

| Two Parts of HE-SIG-A | Bit | Field | Number of bits | Description |
|---|---|---|---|---|
| | | | | Set to 0 if an extra OFDM symbol segment for LDPC is not present<br>Reserved and set to 1 if the Coding field is set to 0 (#15492). |
| | B9 | STBC | 1 | If the DCM field is set to 0, then set to 1 if space time block coding is used. Neither DCM nor STBC shall be applied if (#15493) both the DCM field and STBC field are set to 1.<br>Set to 0 otherwise. |
| | B10 | Beam-formed (#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity (#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC compulation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, an HE-SIG-A field of the HE MU PPDU may be defined as follows.

TABLE 12

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. (#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | STGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |

TABLE 12-continued

| Two Parts of HE-SIG-A | Bit | Field | Number of bits | Description |
|---|---|---|---|---|
| | B11-B14 | Spatial Reuse | 4 | Indicates whether or not spatial reuse is allowed during the transmission of this PPDU(#16806). Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 13

| Two Parts of HE-SIG-A | Bit | Field | Number of bits | Description |
|---|---|---|---|---|
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where im the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 (#15495). |
| | B22 | SIGB Compression | 1 | Set to 0 if the Common field in HE-SIG-B is present. Set to 1 if the Common field in HE-SIG-B is not pres-\ent (#16139) |

TABLE 14

| Two Parts of HE-SIG-A | Bit | Field | Number of bits | Description |
|---|---|---|---|---|
| | B23-B24 | GI + LTF Size | 2 | Indicates the GI duration and HE-LTF size:<br>Set to 0 to indicate a 4x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate a 4x HE-LTF and 3.2 µs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.1 1.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if (#15496) TXVECTOR parameter TXOP DURATION is set to UNSPECIFIED.<br>Set to a value less than 127 to indicate duration information for NA V setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION − 512 )/128)(#16277).<br>where (#16061)<br>B0 indicates the TXOP length granularity. Set to 0 for 8 µs; otherwise set to 1 for 128 µs.<br>B1-B6 indicates the scaled value of the TXOP_DURATION |
| | B7 | Reserved | 1 | Reserved and set to 1 |

TABLE 15

| Two Parts of HE-SIG-A | Bit | Field | Number of bits | Description |
|---|---|---|---|---|
| | B8-B10 | Number of HE-LTF Symbols And Midamble Periodicity | 3 | If the Doppler field is set to 0 (#15497), indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1 (415498), B8-B9 indicates the number of HE-LTF symbols (#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. (#15661) |

TABLE 15-continued

| Two Parts of HE-SIG-A | Bit | Field | Number of bits | Description |
|---|---|---|---|---|
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity (#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, an HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL_REUSE (1) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 17

| Two Parts of HE-SIG-A | Bit | Field | Number of bits | Description |
|---|---|---|---|---|
| | B11-B14 | Spatial Reuse 2 | 4 | indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz:<br>This Spatial Reuse field applies to the second 20 MHz subband.<br>If (#Ed) the STA operating channel width is 20 MHz, then this field is set to the same value as Spatial Reuse 1 field. |

TABLE 17-continued

| Two Parts of HE-SIG-A | Bit | Field | Number of bits | Description |
|---|---|---|---|---|
| | | | | If (#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE (2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 18

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If (#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If (#Ed) the STA operating channel width is 80 + 80 MHz, this field is set to the same value as Spatial Reuse 1 field. Set to the value of the SPATIAL_REUSF(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP AND NON S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 19

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: |

TABLE 19-continued

| Two Parts of HE-SIG-A | Bit | Field | Number of bits | Description |
|---|---|---|---|---|
| | | | | This Spatial Reuse field applies to the fourth 20 MHz subband.<br>If (#Ed) the STA operating channel width is 20 MHz, then this field is set to the same value as Spatial Reuse 1 field.<br>If (#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If (#Ed) the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | (# 16003) Set to 0 for 20 MHz<br>Set to 1 for 40 MHz<br>Set to 2 for 80 MHz<br>Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if (#15499) TXVECTOR parameter TXOP_DURATION is set to UNSPECIFIED.<br>Set to a value less than 127 to indicate duration information for NAV setting and protection of the TXOP as follows:<br>if TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION − 512 )/128)(#16277).<br>where (#16061)<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B 2040 may be included only when a PPDU is for a multi-user (MU) as described above. By default, an HE-SIG-A 2050 or an HE-SIG-B 2060 may include resource allocation information (or virtual resource allocation information) for at least one receiving STA.

Hereinafter, a technical feature regarding the 802.11be standard (i.e., EHT standard) may be described. The 802.11be standard (i.e., EHT standard) may provide a higher data rate than the 802.11ax standard. The extreme high throughput (EHT) standard may support a wide bandwidth (up to 320 MHz), 16 streams, and a multi-band operation.

According to an embodiment, in the EHT standard, the EHT-PPDU may be configured differently depending on the number of receiving STAs (SU/MU) and a transmission method (e.g., preamble puncturing, full bandwidth MU-MIMO, or OFDMA). According to an embodiment, in the EHT standard, the EHT-SIG/U-SIG in the EHT-PPDU may be transmitted by being configured differently.

As described above, a PPDU of various formats or types may be used. Therefore, a technical feature for effectively indicating this may be required. In the specified described below, the technical feature for effectively indicating the format/type of the PPDU may be proposed to use the PPDU of various forms (or formats/types).

Configuration of EHT PPDU

In order to provide a higher data rate than the 802.11ax standard, the EHT standard may be proposed. The EHT standard may support a wide bandwidth (e.g., a bandwidth of at least 320 MHz), 16 streams, and/or a multi-link (or multi-band) operation. Therefore, in order to support a transmission method based on the EHT standard, a new frame format may be used. When a signal is transmitted through a 2.4/5/6 GHz band by using the new frame format, not only a receiver supporting the EHT standard but also conventional Wi-Fi receivers (or STAs) (e.g., receivers based on the 802.11n/ac/ax standard) may receive an EHT signal transmitted through the 2.4/5/6 GHz band.

A preamble of a PPDU based on the EHT standard may be configured variously. Hereinafter, an embodiment in which the preamble of the PPDU based on the EHT standard may be described. Hereinafter, the PPDU based on the EHT standard may be described as an EHT PPDU. However, the EHT PPDU is not limited to the EHT standard. The EHT PPDU may include a PPDU based on not only the 802.11be standard (i.e., EHT standard) but also a new standard advanced/evolved/extended from the 802.11be standard.

According to an embodiment, in the EHT standard, a format for a single user (SU) and a format for a multi-user (MU) may be configured to be different from each other.

According to an embodiment, in the EHT standard, the format for the SU and the format for the MU may be configured to be identical to each other. In this case, the EHT PPDU for the SU and MU may be called an EHT MU PPDU.

Figure 21:
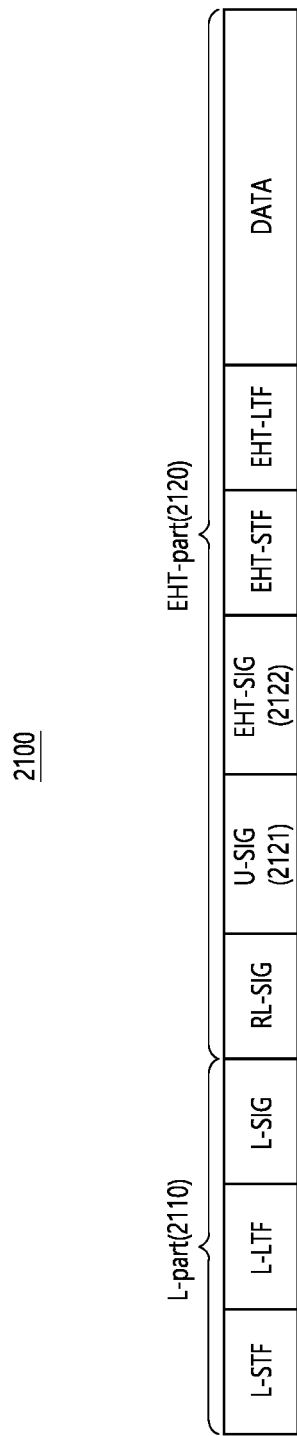
FIG. 21 illustrates an example of an EHT PPDU.

FIG. 21 illustrates an example of an EHT PPDU.

Referring to FIG. 21, an EHT PPDU 2100 may include an L-part 2110 and an EHT-part 2120. The EHT PPDU 2100 may be configured in a format for supporting backward compatibility. In addition, the EHT PPDU 2100 may be transmitted to a single STA and/or multiple STAs.

For coexistence with the legacy STA (an STA based on 802.11n/ac/ax standard), the EHT PPDU 2100 may be configured to have a structure in which the L-part 2110 is transmitted prior to the EHT-part 2120. For example, the L-part 2110 may include L-STF, L-LTF, and L-SIG.

According to an embodiment, the EHT part 2120 may include RL-SIG, U-SIG 2121, EHT-SIG 2122, EHT-STF, EHT-LTF, and EHT-data fields. For example, the U-SIG 2121 may include a version independent field and a version dependent field. An example of the U-SIG 2121 may be described with reference to FIG. 22.

FIG. 22 illustrates an example of U-SIG.

Referring to FIG. 22, a U-SIG 2200 may correspond to the U-SIG 2121 of FIG. 21. The U-SIG 2200 may include a version independent field 2210 and a version dependent field 2220.

According to an embodiment, the version independent field 2210 may include a 3-bit version identifier indicating the EHT standard and a Wi-Fi version after the EHT standard. In other words, the version independent field 2210 may include 3-bit information regarding the EHT standard and the Wi-Fi version after the EHT standard.

According to an embodiment, the version independent field 2210 may further include a DL/UL field of 1 bit, a field regarding BSS color, and/or a field regarding a TXOP duration. In other words, the version independent field 2210 may further include 1-bit information regarding DL/UL, information regarding the BSS color, and/or information regarding the TXOP duration.

According to an embodiment, the version dependent field 2220 may include a field/information regarding a PPDU format type, a field/information regarding a bandwidth, and/or a field/information regarding an MCS.

According to an embodiment, the U-SIG 2200 may consist of two symbols. The two symbols may be jointly encoded. According to an embodiment, the U-SIG 2200 may consist of 52 data tones and 4 pilot tones for each 20 MHz. In addition, the same modulation scheme as that used in the HE-SIG-A of the HE standard may be used in modulation. For example, the U-SIG 2200 may be modulated with BPSK and a 1/2 code rate.

Returning to FIG. 21, the EHT-SIG 2122 may include a version dependent field not included in the U-SIG 2121. In other words, the EHT-SIG 2122 may include information overflown from the U-SIG 2121. For example, the EHT-SIG 2122 may include information dependent on a version of a PPDU. As another example, the EHT-SIG 2122 may include at least some of fields included in HE-SIG-A of the HE standard.

According to an embodiment, the EHT-SIG 2122 may consist of a plurality of OFDM symbols. According to an embodiment, the EHT-SIG 2122 may be modulated with various MCS schemes. For example, the EHT-SIG 2122 may be modulated based on an MCS0 to an MCS5.

According to an embodiment, the EHT-SIG 2122 may include a common field and a user specific field. For example, the common field may include information on a spatial stream and information on RU allocation. For example, the user specific field may include at least one user block field including information on a user. The user specific field may include/indicate information used in a specific user or STA, i.e., information on an ID, MCS, and coding. For example, the user specific field may include at least one user block field.

According to an embodiment, in the EHT PPDU 2100, the L-Part 2110 may be first transmitted. Thereafter, the U-SIG 2121, the EHT-SIG 2122, the EHT-STF, the EHT-LTF, and the EHT data field may be transmitted subsequent to the RL-SIG.

According to an embodiment, the EHT-SIG 2122 may be configured differently or may not exist, based on SU/MU. In other words, the EHT-SIG 2122 may be configured differently when transmitted to a single user and when transmitted to a multi user. In other words, the EHT PPDU 2100 (e.g., the EHT-SIG 2122) may be configured based on the number of target users.

According to an embodiment, the U-SIG 2121 may be configured in unit of 20 MHz. For example, the U-SIG 2121 may be transmitted by being duplicated in a wide bandwidth. For example, the U-SIG 2121 may be configured to include different information in unit of 80 MHz, and the U-SIG 2121 may be configured by being duplicated within 80 MHz. For example, when the EHT PPDU 2100 is configured with a bandwidth of 160 MHz, information included in the U-SIG 2121 of a first 80 MHz bandwidth and a second 80 MHz bandwidth may be configured differently. In the first 80 MHz bandwidth, the U-SIG 2121 may be configured in unit of 20 MHz, and the U-SIG 2121 configured in unit of 20 MHz may be configured by being duplicated within the first 80 MHz bandwidth. In the second 80 MHz bandwidth, the U-SIG 2121 may be configured in unit of 20 MHz, and the U-SIG 2121 configured in unit of 20 MHz may be configured by being duplicated within the second 80 MHz bandwidth.

Hereinafter, an example of various formats/types of an EHT PPDU may be described in detail. The EHT PPDU may be configured based on SU/MU transmission and/or full bandwidth MU-MIMO/non-MU-MIMO.

1. SU-PPDU

A. EHT-SIG of the EHT PPDU may include only a common field to support preamble puncturing and multiple RU combination. For example, in FIG. 21, between the common field and a user specific field, the EHT-SIG 2122 of the EHT PPDU 2100 may include only the common field.

B. For example, the EHT-SIG may consist of part of common information of HE-SIGA of the HE standard and a common field of HE-SIGB.

C. For example, a fixed MCS may be applied to the EHT-SIG. For example, an MCS0 may be applied to the EHT-SIG. As another example, a flexible MCS may be applied to reduce an overhead. For example, the MCS0 to an MCS5 may be applied as the MCS to the EHT-SIG.

2. MU-PPDU

A MU-PPDU (or EHT MU-PPDU) transmitted to a multi-user may be transmitted through two transmission methods. First, the MU-PPDU may be transmitted through full bandwidth MU-MIMO. Second, the MU-PPDU may be transmitted through OFDMA and MU-MIMO. The option A below may describe a configuration of EHT-SIG when the MU-PPDU is transmitted through full bandwidth MU-MIMO. The option B below may describe a configuration of EHT-SIG when the MU-PPDU is transmitted through OFDMA and MU-MIMO.

A. Full bandwidth MU-MIMO

A-i. Since a full bandwidth is used, an RU allocation field is not required as in the 11 ax standard. Therefore, EHT-SIG of the MU-PPDU (or EHT MU-PPDU) may be configured of only a user specific field.

A-ii. For example, in FIG. 21, between a common field and the user specific field, the EHT-SIG 2122 of the EHT PPDU 2100 may include only the user specific field.

B. Multiple user (OFDMA and mu-MIMO)

B-i. When OFDMA and mu-MIMO are used for transmission of the MU-PPDU (or EHT MU-PPDU), the EHT-SIG may be configured of a common field including an RU-allocation field and a user specific field including STA information. For example, in FIG. 21, the EHT-SIG 2122 of the EHT PPDU 2100 may include the common field and the user specific field.

3. TB-PPDU

A. A TB-PPDU (or EHT TB-PPDU) may include only U-SIG, without having to include EHT-SIG. For example, in FIG. 21, the EHT PPDU 2100 may include the U-SIG 2121, without having to include the EHT-SIG 2122.

4. ER-SU-PPDU

A. As in the 1 lax standard, power boosting 3 dB may be applied to an L-part preamble (i.e., L-STF and L-LTF). An SIG field (e.g., EHT-SIG or U-SIG) constituting the SU-PPDU (or EHT SU-PPDU) may be repeated to configure the ER-SU-PPDU. In this case, L-SIG and RL-SIG may be excluded from the SIG field.

A-i. In this case, the repeated SIG field may be repeated identically or may be configured by bypassing an interleaver.

5. Information Field Configuration for Indicating Format/Type of EHT PPDU

As in the aforementioned example, in the EHT standard, a PPDU may be transmitted by being configured in 5 forms/types/formats, based on the number of transmitting STAs and/or a transmission method. Therefore, an information bit of U-SIG may be used to indicate the PPDU as in the aforementioned example. An EHT STA may indicate the form/type/format of the PPDU, based on the information bit.

A. For example, the information bit may be named in various field names such as a PPDU type/PPDU format/transmission mode, etc.

B. The indication bit may consist of 2 or 3 bits.

B-i. In consideration of the throughput increment, PPDUs of the remaining four types, except for the ER-SU PPDU, may be used in signal transmission in the EHT standard. In this case, the indication bit may consist of 2 bits. An example of the indication bit may be described below.

B-i-1. For example, the information bit may be named as a format/type field. In this case, 2 bits of the format/type field may be configured as shown in Table 21.

TABLE 21

| Bits | PPDU type/format | EHT-SIG configuration |
| --- | --- | --- |
| 00 | SU-PPDU | Only common field |
| 01 | MU-PPDU for full bandwidth MU-MIMO | Only user specific field |
| 10 | MU-PPDU for OFDMA and MU-MIMO | Common field and user specific field |
| 11 | TB-PPDU | Not existed |

Referring to Table 21, when the information bit is set to a first value (e.g., 00), a type/format of the PPDU (e.g., EHT PPDU) may be set to an SU-PPDU. In addition, in the SU-PPDU, EHT-SIG may be configured of only a common field.

When the information bit is set to a second value (e.g., 01), the type/format of the PPDU (e.g., EHT PPDU) may be set to a MU-PPDU transmitted through full bandwidth MU-MIMO. In addition, in the MU-PPDU transmitted in the full bandwidth MU-MIMO, the EHT-SIG may be configured of only a user specific field.

When the information bit is set to a third value (e.g., 10), the type/format of the PPDU (e.g., EHT PPDU) may be set to a MU-PPDU transmitted through full bandwidth MU-MIMO. In addition, in the MU-PPDU transmitted through OFDMA and MU-MIMO, the EHT-SIG may be configured of only a user specific field.

When the information bit is set to a fourth value (e.g., 11), the type/format of the PPDU (e.g., EHT PPDU) may be set to a TB-PPDU. In addition, the EHT-SIG may not exist in the TB-PPDU. In other words, the EHT-SIG may be omitted in the TB-PPDU.

B-ii. Unlike in the aforementioned example, the information bit may consist of 3 bits in consideration of all cases of the format/type of the PPDU (e.g., EHT PPDU). The information bit may be configured/set as shown in Table 22.

TABLE 22

| Bits | PPDU type/format | EHT-SIG configuration |
| --- | --- | --- |
| 000 | SU-PPDU | Only common field |
| 001 | MU-PPDU for full bandwidth MU-MIMO | Only user specific field |
| 010 | MU-PPDU for OFDMA and MU-MIMO | Common field and user specific field |
| 011 | TB-PPDU | Not existed |
| 100 | ER-SU PPDU | Only common field and repeated |
| 101-111 | Reserved | |

Referring to Table 22, when the information bit is set to the first value (e.g., 000), the type/format of the PPDU (e.g., EHT PPDU) may be set to the SU-PPDU. In addition, in the SU-PPDU, EHT-SIG may be configured of only a common field.

When the information bit is set to a second value (e.g., 001), the type/format of the PPDU (e.g., EHT PPDU) may be set to a MU-PPDU transmitted through full bandwidth MU-MIMO. In addition, in the MU-PPDU transmitted in the full bandwidth MU-MIMO, the EHT-SIG may be configured of only a user specific field.

When the information bit is set to a third value (e.g., 010), the type/format of the PPDU (e.g., EHT PPDU) may be set to a MU-PPDU transmitted through full bandwidth MU-MIMO. In addition, in the MU-PPDU transmitted through OFDMA and MU-MIMO, the EHT-SIG may be configured of only a user specific field.

When the information bit is set to a fourth value (e.g., 011), the type/format of the PPDU (e.g., EHT PPDU) may be set to a TB-PPDU. In addition, the EHT-SIG may not exist in the TB-PPDU. In other words, the EHT-SIG may be omitted in the TB-PPDU.

When the information bit is set to a fifth value (e.g., 100), the type/format of the PPDU (e.g., EHT PPDU) may be set to an ER-SU-PPDU. In addition, in the ER-SU-PPDU, the EHT-SIG may be configured of only a common field. The common field may be configured repeatedly.

As in the aforementioned examples, a PPDU/format used in transmission may be indicated based on a subfield or bits of U-SIG. Therefore, there is an advantage in that the PPDU format/type can be early indicated through the subfield or bits of the U-SIG. In addition, there is an advantage in that a signaling overhead can be reduced since the information bit is not used by being allocated to the EHT-SIT/U-SIG additionally to indicate PPDU information.

Hereinafter, operations of a transmitting STA and receiving STA may be described according to the aforementioned embodiments.

Figure 23:
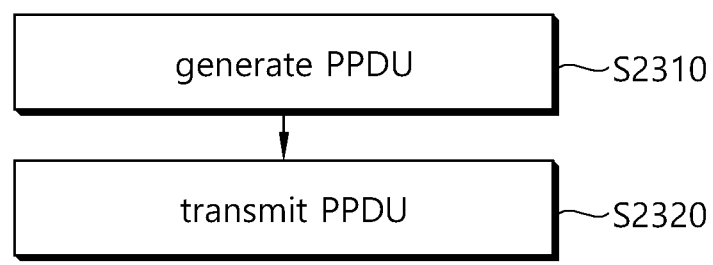
FIG. 23 is a flowchart illustrating an operation of a transmitting STA.

FIG. 23 is a flowchart illustrating an operation of a transmitting STA.

Referring to FIG. 23, in step S2310, the transmitting STA may generate a PPDU.

For example, the PPDU may include a PPDU of the EHT standard (e.g., EHT PPDU).

According to an embodiment, the transmitting STA may generate a PPDU including a first signal field and a second signal field. For example, the first signal field may include U-SIG. For example, the second signal field may include EHT-SIG.

For example, the first signal field and the second signal field may be separately encoded. For example, in the first signal field, two symbols may be jointly encoded. In addition, the first signal field and the second signal field may be separately modulated.

According to an embodiment, additionally, the PPDU may further include an L-SIG field and an RL-SIG field. For example, the RL-SIG field may be contiguous to the L-SIG field. For example, the first signal field may be contiguous to the RL-SIG field.

For example, the transmitting STA may set a value of a length field of the L-SIG field, based on a transmission time of the PPDU. For example, a result of "module-3 operation" for the value of the length field of the L-SIG field may be set to "0".

For example, the RL-SIG field may be configured such that the L-SIG field is repeated. For example, the RL-SIG field may include the same information field as the L-SIG field, and may be modulated in the same manner. The L-SIG field and the RL-SIG field may be separately modulated through BPSK.

According to an embodiment, the first signal field may include information on a version of the PPDU. The information on the version of the PPDU may be determined based on whether the PPDU is an EHT PPDU.

For example, the information on the version of the PPDU may be configured of 3-bit information. The information on the version of the PPDU may include information indicating that the PPDU is a PPDU based on the EHT standard (i.e., EHT PPDU). In addition, the information on the version of the PPDU may include information for classifying the PPDU according to a standard after the 802.11be standard (i.e., EHT standard). In other words, the information on the version of the PPDU may include information for classifying the PPDU according to the EHT standard and a standard determined/generated/established after the EHT standard. That is, the information on the version of the PPDU may include information indicating that the PPEU is a PPDU of the EHT standard or after the EHT standard.

According to an embodiment, a PPDU type and a PPDU version may be used separately. The PPDU type may be used to classify the PPDU according to the EHT standard and the standard (e.g., 802.11n/ac/ax) before the EHT standard. On the other hand, the PPDU version may be used to classify the PPDU according to the EHT standard and the standard after the EHT standard. For example, the PPDU version may be called variously. For example, the PPDU version may be called a PHY version, a packet version, a packet identifier, a Wi-Fi version, or the like.

According to an embodiment, a PPDU format may imply a type in which the PPDU is transmitted. For example, the PPDU format may include at least one of an SU-PPDU, a MU-PPDU for full bandwidth MU-MIMO, a MU-PPDU for OFDMA and MU-MIMO, a TB-PPDU, and an ER-SU-PPDU. The PPDU format is not limited to the aforementioned example, and various formats may be included.

According to an embodiment, a first signal field may include 3-bit information. For example, the 3-bit information may include information on the PPDU format. For example, the 3-bit information may indicate the PPDU format. For example, the 3-bit information may not be configured consecutively. The 3-bit information may be configured independently in the first signal field. For example, the 3-bit information may be configured of 1-bit information and consecutive 2-bit information.

According to an embodiment, a second signal field may be configured based on the 3-bit information. A configuration of the second signal field may be set differently based on the 3-bit information. For example, the second signal field may be configured based on a common field and a user specific field. For example, the common field may include information on RU allocation. For example, the user specific field may include information on a receiving target STA.

For example, the 3-bit information may include information on the number of users for receiving the PPDU, whether orthogonal frequency division multiple access (OFDMA) is applied to the PPDU, whether multi-user multiple input multiple output (MU-MIMO) is applied to the PPDU, and whether the PPDU is a trigger-based (TB) PPDU.

For example, whether the PPDU is related to single user (SU) transmission or multiple user (MU) transmission, whether the PPDU is related to orthogonal frequency division multiple access (OFDMA), whether the PPDU is related to multi-user multiple input multiple output (MU-MIMO), and whether the PPDU is related to a trigger-based (TB) PPDU may be determined based on the 3-bit information.

For example, a receiving target user of the PPDU may be determined as a single user, based on that the 3-bit information is a first value (e.g., 000 or 0). In other words, it may be determined that the PPDU is related to SU transmission, based on that the 3-bit information is the first value (e.g., 000 or 0). In other words, the transmitting STA may set the 3-bit information to the first value, based on that the receiving target user of the PPDU is the single user.

The second signal field may be configured of the common field, based on that the 3-bit information is the first value. That is, between the common field and a user specific field, the second signal field may be configured of only the common field, based on that the 3-bit information is the first value.

For example, a receiving target user of the PPDU may be determined as a multi-user, based on that the 3-bit information is a second value (e.g., 001 or 1). In other words, it may be determined that the PPDU is related to MU transmission, based on that the 3-bit information is the second value (e.g., 001 or 1). In addition, it may be determined that the PPDU is related to MU-MIMO, based on that the 3-bit information is the second value. It may be determined that the PPDU does not relate to OFDMA (or it is non-OFDMA), based on that the 3-bit information is the second value. The non-OFDMA may imply that MU-MIMO is applied to a full bandwidth of the PPDU. For example, MU-MIMO may be applied to the full bandwidth of the PPDU, based on that the 3-bit information is the second value. In other words, the transmitting STA may set the 3-bit information to the second value, based on that the receiving target user of the PPDU is the multi-user and the MU-MIMO is applied to the full bandwidth of the PPDU.

The second signal field may be configured of the user specific field, based on that the 3-bit information is the second value. That is, between a common field and the user specific field, the second signal field may be configured of only the user specific field, based on that the 3-bit information is the second value.

For example, a receiving target user of the PPDU may be determined as a multi-user, based on that the 3-bit information is a third value (e.g., 010 or 2). In other words, it may be determined that the PPDU is related to MU transmission, based on that the 3-bit information is the third value (e.g., 010 or 2). In addition, it may be determined that the PPDU is related to OFDMA and MU-MIMO, based on that the 3-bit information is the third value. For example, MU-MIMO and OFDMA may be applied to the PPDU, based on that the 3-bit information is the third value. In other words, the transmitting STA may set the 3-bit information to the third value, based on that the receiving target user of the PPDU is the multi-user and the MU-MIMO and OFDMA are applied to the PPDU.

The second signal field may be configured of the common field and the user specific field, based on that the 3-bit information is the third value. That is, the second signal field may be configured of both the common field and the user specific field, based on that the 3-bit information is the third value.

For example, it may be determined that the PPDU is related to a trigger-based (TB) PPDU, based on that the 3-bit information is a fourth value (e.g., 011 or 3). In other words, the PPDU may be determined as the TB PPDU, based on that the 3-bit information is the fourth value (e.g., 011 or 3). In addition, the transmitting STA may set the 3-bit information to the fourth value, based on that the PPDU is the TB PPDU.

The second signal field may be configured not to include both the common field and the user specific field, based on that the 3-bit information is the fourth value. In other words, the second signal field may be omitted, based on that the 3-bit information is the fourth value.

For example, the receiving target user of the PPDU may be determined as a single user, based on that the 3-bit information is a fifth value (e.g., 100 or 4). In other words, it may be determined that the PPDU is related to SU transmission, based on that the 3-bit information is the fifth value (e.g., 100 or 4). The PPDU may be subjected to 3 dB power boosting to cover an extended range, based on that the 3-bit information is the fifth value. Based on that the 3-bit information is the fifth value, the second signal field may be configured of the common field, and the common field may be configured by being repeated within the second signal.

According to an embodiment, the first signal field may be configured in unit of 80 MHz. For example, the first signal field may be configured by being duplicated in unit of 20 MHz within the 80 MHz. For example, when a bandwidth of the PPDU is 160 MHz, information included in the first signal field of a first 80 MHz duration and information included in the first signal field of a second 80 MHz duration may be configured differently. In addition, the first signal field of the first 80 MHz duration may be configured by being duplicated in unit of 20 MHz. The first signal field of the second 80 MHz duration may also be configured by being duplicated in unit of 20 MHz.

In step S2320, the transmitting STA may transmit the PPDU.

According to an embodiment, each field included in the PPDU may be transmitted through a symbol. For example, the L-SIG field may be transmitted through a first symbol. The RL-SIG field may be transmitted through a second symbol contiguous to the first symbol. The first signal field may be transmitted through a third symbol contiguous to the second symbol. The second signal field may be transmitted through a fourth symbol.

For example, the first symbol may consist of one symbol. The second symbol may consist of one symbol. The third symbol may consist of two symbols. Therefore, the first signal field may be transmitted through two symbols. For example, the fourth symbol may be consist of at least one symbol or at least one or more symbols. Therefore, the second signal field may be transmitted through at least one symbol or at least one or more symbols.

Figure 24:
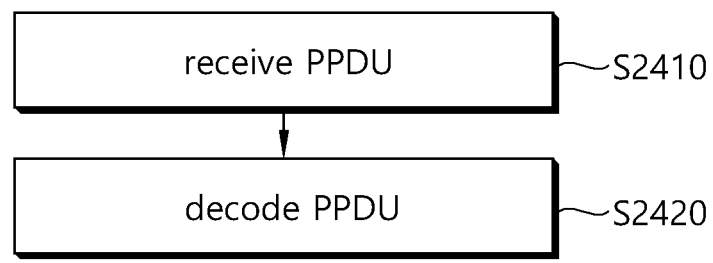
FIG. 24 is a flowchart illustrating an operation of a receiving STA.

FIG. 24 is a flowchart illustrating an operation of a receiving STA.

Referring to FIG. 24, in step S2410, the receiving STA may receive a PPDU.

For example, the PPDU may include a PPDU of the EHT standard (e.g., EHT PPDU).

According to an embodiment, the receiving STA may receive a PPDU including a first signal field and a second signal field. For example, the first signal field may include U-SIG. For example, the second signal field may include EHT-SIG.

For example, the first signal field and the second signal field may be separately encoded. For example, in the first signal field, two symbols may be jointly encoded. In addition, the first signal field and the second signal field may be separately modulated.

According to an embodiment, additionally, the PPDU may further include an L-SIG field and an RL-SIG field. For example, the RL-SIG field may be contiguous to the L-SIG field. For example, the first signal field may be contiguous to the RL-SIG field. For example, the second signal field may be contiguous to the first signal field.

According to an embodiment, each field included in the PPDU may be received through a symbol. For example, the L-SIG field may be received through a first symbol. The RL-SIG field may be received through a second symbol contiguous to the first symbol. The first signal field may be received through a third symbol contiguous to the second symbol. The second signal field may be received through a fourth symbol.

For example, the first symbol may consist of one symbol. The second symbol may consist of one symbol. The third symbol may consist of two symbols. Therefore, the first signal field may be received through two symbols. For example, the fourth symbol may be consist of at least one symbol or at least one or more symbols. Therefore, the second signal field may be received through at least one symbol or at least one or more symbols.

For example, a value of a length field of the L-SIG field may be set based on a transmission time of the PPDU. For example, a result of "module-3 operation" for the value of the length field of the L-SIG field may be set to "0".

For example, the RL-SIG field may be configured such that the L-SIG field is repeated. For example, the RL-SIG field may include the same information field as the L-SIG field, and may be modulated in the same manner. The L-SIG field and the RL-SIG field may be separately modulated through BPSK.

According to an embodiment, the first signal field may include information on a version of the PPDU. The information on the version of the PPDU may be determined based on whether the PPDU is an EHT PPDU.

For example, the information on the version of the PPDU may be configured of 3-bit information. The information on the version of the PPDU may include information indicating that the PPDU is a PPDU based on the EHT standard (i.e., EHT PPDU). In addition, the information on the version of the PPDU may include information for classifying the PPDU according to a standard after the 802.11be standard (i.e., EHT standard). In other words, the information on the version of the PPDU may include information for classifying the PPDU according to the EHT standard and a standard determined/generated/established after the EHT standard. That is, the information on the version of the PPDU may include information indicating that the PPEU is a PPDU of the EHT standard or after the EHT standard.

According to an embodiment, a PPDU type and a PPDU version may be used separately. The PPDU type may be used to classify the PPDU according to the EHT standard and the standard (e.g., 802.11n/ac/ax) before the EHT standard. On the other hand, the PPDU version may be used to classify the PPDU according to the EHT standard and the standard after the EHT standard. For example, the PPDU version may be called variously. For example, the PPDU version may be called a PHY version, a packet version, a packet identifier, a Wi-Fi version, or the like.

According to an embodiment, a PPDU format may imply a type in which the PPDU is transmitted. For example, the PPDU format may include at least one of an SU-PPDU, a MU-PPDU for full bandwidth MU-MIMO, a MU-PPDU for OFDMA and MU-MIMO, a TB-PPDU, and an ER-SU-PPDU. The PPDU format is not limited to the aforementioned example, and various formats may be included.

According to an embodiment, a first signal field may include 3-bit information. For example, the 3-bit information may include information on the PPDU format. For example, the 3-bit information may indicate the PPDU format. For example, the 3-bit information may not be configured consecutively. The 3-bit information may be configured independently in the first signal field. For example, the 3-bit information may be configured of 1-bit information and consecutive 2-bit information.

According to an embodiment, a second signal field may be configured based on the 3-bit information. A configuration of the second signal field may be set differently based on the 3-bit information. For example, the second signal field may be configured based on a common field and a user specific field. For example, the common field may include information on RU allocation. For example, the user specific field may include information on a receiving target STA.

For example, the 3-bit information may include information on the number of users for receiving the PPDU, whether orthogonal frequency division multiple access (OFDMA) is applied to the PPDU, whether multi-user multiple input multiple output (MU-MIMO) is applied to the PPDU, and whether the PPDU is a trigger-based (TB) PPDU.

For example, whether the PPDU is related to single user (SU) transmission or multiple user (MU) transmission, whether the PPDU is related to orthogonal frequency division multiple access (OFDMA), whether the PPDU is related to multi-user multiple input multiple output (MU-MIMO), and whether the PPDU is related to a trigger-based (TB) PPDU may be determined based on the 3-bit information.

For example, a receiving target user of the PPDU may be determined as a single user, based on that the 3-bit information is a first value (e.g., 000 or 0). In other words, it may be determined that the PPDU is related to SU transmission, based on that the 3-bit information is the first value (e.g., 000 or 0). In other words, the receiving STA may confirm that a receiving target user of the PPDU is a single user, based on that the 3-bit information is the first value.

The second signal field may be configured of the common field, based on that the 3-bit information is the first value. That is, between the common field and a user specific field, the second signal field may be configured of only the common field, based on that the 3-bit information is the first value.

For example, a receiving target user of the PPDU may be determined as a multi-user, based on that the 3-bit information is a second value (e.g., 001 or 1). In other words, it may be determined that the PPDU is related to MU transmission, based on that the 3-bit information is the second value (e.g., 001 or 1). In addition, it may be determined that the PPDU is related to MU-MIMO, based on that the 3-bit information is the second value. It may be determined that the PPDU does not relate to OFDMA (or it is non-OFDMA), based on that the 3-bit information is the second value. The non-OFDMA may imply that MU-MIMO is applied to a full bandwidth of the PPDU. For example, MU-MIMO may be applied to the full bandwidth of the PPDU, based on that the 3-bit information is the second value. In other words, the receiving STA may confirm that the receiving target user of the PPDU is a multi-user and the MU-MIMO is applied to the full bandwidth of the PPDU, based on that the 3-bit information is the second value.

The second signal field may be configured of the user specific field, based on that the 3-bit information is the second value. That is, between a common field and the user specific field, the second signal field may be configured of only the user specific field, based on that the 3-bit information is the second value.

For example, a receiving target user of the PPDU may be determined as a multi-user, based on that the 3-bit information is a third value (e.g., 010 or 2). In other words, it may be determined that the PPDU is related to MU transmission, based on that the 3-bit information is the third value (e.g., 010 or 2). In addition, it may be determined that the PPDU is related to OFDMA and MU-MIMO, based on that the 3-bit information is the third value. For example, MU-MIMO and OFDMA may be applied to the PPDU, based on that the 3-bit information is the third value. In other words, the receiving STA may confirm that the receiving target user of the PPDU is the multi-user and the MU-MIMO and OFDMA are applied to the PPDU, based on that the 3-bit information is the third value.

The second signal field may be configured of the common field and the user specific field, based on that the 3-bit information is the third value. That is, the second signal field may be configured of both the common field and the user specific field, based on that the 3-bit information is the third value.

For example, it may be determined that the PPDU is related to a trigger-based (TB) PPDU, based on that the 3-bit information is a fourth value (e.g., 011 or 3). In other words, the PPDU may be determined as the TB PPDU, based on that the 3-bit information is the fourth value (e.g., 011 or 3). In addition, the receiving STA may confirm that the PPDU is the TB PPDU, based on that the 3-bit information is the fourth value.

The second signal field may be configured not to include both the common field and the user specific field, based on that the 3-bit information is the fourth value. In other words, the second signal field may be omitted, based on that the 3-bit information is the fourth value.

For example, the receiving target user of the PPDU may be determined as a single user, based on that the 3-bit information is a fifth value (e.g., 100 or 4). In other words, it may be determined that the PPDU is related to SU transmission, based on that the 3-bit information is the fifth value (e.g., 100 or 4). The PPDU may be subjected to 3 dB power boosting to cover an extended range, based on that the 3-bit information is the fifth value. Based on that the 3-bit information is the fifth value, the second signal field may be configured of the common field, and the common field may be configured by being repeated within the second signal. In other words, the receiving STA may confirm that the receiving target user of the PPDU is the single user and the common field is configured by being repeated within the second signal field, based on that the 3-bit information is the fifth value.

According to an embodiment, the first signal field may be configured in unit of 80 MHz. For example, the first signal field may be configured by being duplicated in unit of 20 MHz within the 80 MHz. For example, when a bandwidth of the PPDU is 160 MHz, information included in the first signal field of a first 80 MHz duration and information included in the first signal field of a second 80 MHz duration may be configured differently. In addition, the first signal field of the first 80 MHz duration may be configured by being duplicated in unit of 20 MHz. The first signal field of the second 80 MHz duration may also be configured by being duplicated in unit of 20 MHz.

According to an embodiment, each field included in the PPDU may be transmitted through a symbol. For example, the L-SIG field may be transmitted through a first symbol. The RL-SIG field may be transmitted through a second symbol contiguous to the first symbol. The first signal field may be transmitted through a third symbol contiguous to the second symbol. The second signal field may be transmitted through a fourth symbol.

For example, the first symbol may consist of one symbol. The second symbol may consist of one symbol. The third symbol may consist of two symbols. Therefore, the first signal field may be transmitted through two symbols. For example, the fourth symbol may be consist of at least one symbol or at least one or more symbols. Therefore, the second signal field may be transmitted through at least one symbol or at least one or more symbols.

In step S2420, the receiving STA may decode the PPDU. According to an embodiment, the receiving STA may decode the PPDU, based on the first signal field and the second signal field.

The aforementioned technical feature of the present specification may be applied to various devices and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, the device of the present specification may include a processor and a memory coupled to the processor. The processor may be configured to: obtain a PPDU, wherein the PPDU includes a first signal field and a second signal field, the first signal field includes 3-bit information, whether the PPDU is related to SU transmission or MU transmission, whether the PPDU is related to OFDMA, whether the PPDU is related to MU-MIMO, and whether the PPDU is related to TB PPDU are determined based on the 3-bit information, and the second signal field is configured based on the 3-bit information; and the second signal field is configured based on the 3-bit information; and decode the PPDU, based on the first signal field and the second signal field.

The technical feature of the present specification may be implemented based on a computer readable medium (CRM). For example, the CRM proposed in the present specification may be encoded with at least one computer program including instructions. The instruction stored in the CRM of the present specification may be executed by at least one processor. The instructions, when executed by the at least one processor, may cause the at least one processor to perform operations including: obtaining a PPDU, wherein the PPDU includes a first signal field and a second signal field, the first signal field includes 3-bit information, whether the PPDU is related to SU transmission or MU transmission, whether the PPDU is related to OFDMA, whether the PPDU is related to MU-MIMO, and whether the PPDU is related to a TB PPDU are determined based on the 3-bit information, and the second signal field is configured based on the 3-bit information; and decoding the PPDU, based on the first signal field and the second signal field. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method performed in a receiving station (STA) of a wireless local area network (WLAN) system, the method comprising:
receiving a physical layer protocol data unit (PPDU),
wherein the PPDU includes a legacy signal (L-SIG), a repeated L-SIG (RL-SIG), and a universal signal (U-SIG),
wherein the L-SIG is contiguous to the RL-SIG, and the L-SIG includes same bit information as the RL-SIG,
wherein a result of a "modulo 3" operation for a value of a length field included in the L-SIG is zero (0), wherein the RL-SIG is contiguous to the U-SIG, and the U-SIG includes two symbols, wherein the U-SIG includes a physical (PHY) version identifier field having a length of 3 bits, wherein the PHY version identifier field has a pre-determined value for identifying Extremely High Throughput (EHT), wherein the U-SIG includes a basic service set (BSS) color field and a transmission opportunity (TXOP) duration field related to the PPDU, wherein the U-SIG further includes 3-bit information, wherein the 3-bit information has a first value for identifying that the PPDU is received based on orthogonal frequency division multiple access (OFDMA) technique for multiple users, the 3-bit information has a second value for identifying that the PPDU is received based on non-OFDMA technique for multiple users, and the 3-bit information has a third value for identifying that the PPDU is received for a single user; and decoding the U-SIG to interpret the PPDU.

2. The method of claim 1, wherein the PPDU further includes an EHT signal (EHT-SIG), and the EHT-SIG is configured based on a common field and a user specific field.

3. The method of claim 2, wherein contents of the EHT-SIG is determined based on the 3-bit information.

4. A method performed in a transmitting station (STA) of a wireless local area network (WLAN) system, the method comprising:

generating a physical layer protocol data unit (PPDU), wherein the PPDU includes a legacy signal (L-SIG), a repeated L-SIG (RL-SIG), and a universal signal (U-SIG), wherein the L-SIG is contiguous to the RL-SIG, and the L-SIG includes same bit information as the RL-SIG, wherein a result of a "modulo 3" operation for a value of a length field included in the L-SIG is zero (0), wherein the RL-SIG is contiguous to the U-SIG, and the U-SIG includes two symbols, wherein the U-SIG includes a physical (PHY) version identifier field having a length of 3 bits, wherein the PHY version identifier field has a pre-determined value for identifying Extremely High Throughput (EHT), wherein the U-SIG includes a basic service set (BSS) color field and a transmission opportunity (TXOP) duration field related to the PPDU, wherein the U-SIG further includes 3-bit information, wherein the 3-bit information has a first value for identifying that the PPDU is transmitted based on orthogonal frequency division multiple access (OFDMA) technique for multiple users, the 3-bit information has a second value for identifying that the PPDU is transmitted based on non-OFDMA technique for multiple users, and the 3-bit information has a third value for identifying that the PPDU is transmitted for a single user; and transmitting the PPDU.

5. A receiving station (STA) used in a wireless local area network (WLAN) system, the receiving STA comprising:

a transceiver transmitting/receiving a radio signal; and a processor coupled to the transceiver, wherein the processor is configured to:

receive a physical layer protocol data unit (PPDU), wherein the PPDU includes a legacy signal (L-SIG), a repeated L-SIG (RL-SIG), and a universal signal (U-SIG), wherein the L-SIG is contiguous to the RL-SIG, and the L-SIG includes same bit information as the RL-SIG, wherein a result of a "modulo 3" operation for a value of a length field included in the L-SIG is zero (0), wherein the RL-SIG is contiguous to the U-SIG, and the U-SIG includes two symbols, wherein the U-SIG includes a physical (PHY) version identifier field having a length of 3 bits, wherein the PHY version identifier field has a pre-determined value for identifying Extremely High Throughput (EHT), wherein the U-SIG includes a basic service set (BSS) color field and a transmission opportunity (TXOP) duration field related to the PPDU, wherein the U-SIG further includes 3-bit information, wherein the 3-bit information has a first value for identifying that the PPDU is received based on orthogonal frequency division multiple access (OFDMA) technique for multiple users, the 3-bit information has a second value for identifying that the PPDU is received based on non-OFDMA technique for multiple users, and the 3-bit information has a third value for identifying that the PPDU is received for a single user; and decode the U-SIG to interpret the PPDU.

6. A transmitting station (STA) used in a wireless local area network (WLAN) system, the transmitting STA comprising:

a transceiver transmitting/receiving a radio signal; and a processor coupled to the transceiver, wherein the processor is configured to:

generate a physical layer protocol data unit (PPDU), wherein the PPDU includes a legacy signal (L-SIG), a repeated L-SIG (RL-SIG), and a universal signal (U-SIG), wherein the L-SIG is contiguous to the RL-SIG, and the L-SIG includes same bit information as the RL-SIG, wherein a result of a "modulo 3" operation for a value of a length field included in the L-SIG is zero (0), wherein the RL-SIG is contiguous to the U-SIG, and the U-SIG includes two symbols, wherein the U-SIG includes a physical (PHY) version identifier field having a length of 3 bits, wherein the PHY version identifier field has a pre-determined value for identifying Extremely High Throughput (EHT), wherein the U-SIG includes a basic service set (BSS) color field and a transmission opportunity (TXOP) duration field related to the PPDU, wherein the U-SIG further includes 3-bit information, wherein the 3-bit information has a first value for identifying that the PPDU is transmitted based on orthogonal frequency division multiple access (OFDMA) technique for multiple users, the 3-bit information has a second value for identifying that the PPDU is transmitted based on non-OFDMA technique for multiple users, and the 3-bit information has a third value for identifying that the PPDU is transmitted for a single user; and transmit the PPDU.

7. An apparatus used in a wireless local area network (WLAN) system, the apparatus comprising:

a processor; and a memory coupled to the processor, wherein the processor is configured to:

obtain a physical layer protocol data unit (PPDU), wherein the PPDU includes a legacy signal (L-SIG), a repeated L-SIG (RL-SIG), and a universal signal (U-SIG), wherein the L-SIG is contiguous to the RL-SIG, and the L-SIG includes same bit information as the RL-SIG, wherein a result of a "modulo 3" operation for a value of a length field included in the L-SIG is zero (0), wherein the RL-SIG is contiguous to the U-SIG, and the U-SIG includes two symbols, wherein the U-SIG includes a physical (PHY) version identifier field having a length of 3 bits, wherein the PHY version identifier field has a pre-determined value for identifying Extremely High Throughput (EHT), wherein the U-SIG includes a basic service set (BSS) color field and a transmission opportunity (TXOP) duration field related to the PPDU, wherein the U-SIG further includes 3-bit information, wherein the 3-bit information has a first value for identifying that the PPDU is received based on orthogonal frequency division multiple access (OFDMA) technique for multiple users, the 3-bit information has a second value for identifying that the PPDU is received based on non-OFDMA technique for multiple users, and the 3-bit information has a third value for identifying that the PPDU is received for a single user; and decode the U-SIG to interpret the PPDU.

\* \* \* \* \*